(12) United States Patent
Kobayashi et al.

(10) Patent No.: US 7,706,344 B2
(45) Date of Patent: Apr. 27, 2010

(54) MOBILE TERMINAL DEVICE, CONTROL METHOD, AND MOBILE COMMUNICATION SYSTEM

(75) Inventors: Motonari Kobayashi, Yokohama (JP); Masanori Morita, Tachikawa (JP); Naohisa Takahashi, Nagoya (JP); Yoshiaki Katayama, Nagoya (JP); Koichi Wada, Nagoya (JP)

(73) Assignees: Nagoya Institute of Technology, Nagoya-shi (JP); NTT DoCoMo, Inc., Tokyo (JP)

( * ) Notice: Subject to any disclaimer, the term of this patent is extended or adjusted under 35 U.S.C. 154(b) by 545 days.

(21) Appl. No.: 11/680,086

(22) Filed: Feb. 28, 2007

(65) Prior Publication Data
US 2007/0201418 A1    Aug. 30, 2007

(30) Foreign Application Priority Data
Feb. 28, 2006    (JP)    ............................. 2006-053620

(51) Int. Cl.
*H04W 4/00*    (2009.01)
(52) U.S. Cl. ........................ 370/338; 455/433; 370/328
(58) Field of Classification Search ........................ None
See application file for complete search history.

(56) References Cited

U.S. PATENT DOCUMENTS

| 7,171,476 | B2* | 1/2007 | Maeda et al. | ............... | 709/227 |
| 7,184,421 | B1* | 2/2007 | Liu et al. | ................... | 370/338 |
| 2002/0071395 | A1 | 6/2002 | Redi et al. | | |
| 2004/0003111 | A1 | 1/2004 | Maeda et al. | | |
| 2004/0018839 | A1* | 1/2004 | Andric et al. | ............... | 455/433 |

FOREIGN PATENT DOCUMENTS

| EP | 1 324 532 A2 | 7/2003 |
| JP | 2002-534842 | 10/2002 |

(Continued)

OTHER PUBLICATIONS

T. Clausen, et al. "Optimized Link State Routing Protocol (OLSR)", Network Working Group RFC 3626, Oct. 2003, pp. 1-74.

*Primary Examiner*—Erika A Gary
(74) *Attorney, Agent, or Firm*—Oblon, Spivak, McClelland, Maier & Neustadt, L.L.P.

(57) ABSTRACT

A mobile terminal device that forms an adhoc network comprises a clustering section that identifies the ID and state of a mobile terminal device that is adjacent to the mobile terminal device itself by exchanging a Hello packet (containing the ID and state of the mobile terminal device itself) with the other mobile terminal device and which, based on the state of the adjacent mobile terminal device and the state of the mobile terminal device itself, sets the state of the mobile terminal device itself as a cluster head, gateway, or member; a storage section that stores the ID and state of the adjacent mobile terminal device and the state of the mobile terminal device itself; a link information transmit/receive section which, when the state of the mobile terminal device itself is the cluster head, transmits link information containing the ID of the adjacent mobile terminal device and the ID of the mobile terminal device itself and receives link information from the other mobile terminal device; and a routing section that finds a route to any mobile terminal device on the basis of the link information thus transmitted and received.

8 Claims, 26 Drawing Sheets

FOREIGN PATENT DOCUMENTS

| | | |
|---|---|---|
| JP | 2004-266556 | 9/2004 |
| JP | 2004-282490 | 10/2004 |
| JP | 2005-515695 | 5/2005 |
| JP | 2006-50460 | 2/2006 |

* cited by examiner

| ADJACENT TERMINAL ID | STATE | PARENT ID | TREE CONSTITUTION |
|---|---|---|---|
| MT#2 | M | MT#3 | N |
| MT#3 | H | — | Y |
| MT#4 | M | MT#3 | N |
| MT#6 | M | MT#7 | N |
| MT#7 | H | MT#5 | Y |
| MT#8 | M | MT#7 | N |

| TERMINAL ID | NEXT HOP |
|---|---|
| MT#1 | MT#3 |
| MT#2 | MT#3 |
| MT#3 | DIRECT |
| MT#4 | MT#3 |
| MT#6 | MT#7 |
| MT#7 | DIRECT |
| MT#8 | MT#7 |
| MT#9 | MT#7 |

| STATE | PARENT ID |
|-------|-----------|
| G | MT#3 |

Fig.16

| ID OF THE MOBILE TERMINAL DEVICE ITSELF | ID_1 OF ADJACENT TERMINAL | ID_2 OF ADJACENT TERMINAL | ..... |
|---|---|---|---|

MOBILE TERMINAL DEVICE, CONTROL METHOD, AND MOBILE COMMUNICATION SYSTEM

CROSS-REFERENCE TO RELATED APPLICATIONS

This application claims the benefit of priority under 35 U.S.C. §119 from Japanese Patent Application No. 2006-053620, filed Feb. 28, 2006, the entire contents of which is incorporated herein by reference.

BACKGROUND OF THE INVENTION

1. Field of the Invention

The present invention relates to a mobile terminal device (also referred to simply as 'terminal' hereinbelow) that constitutes an adhoc network, a control method, and a mobile communication system.

Further, in this specification, 'transmit' signifies that a mobile terminal device transmits packets to an adjacent mobile terminal device as the transmission source of the packets and 'transfer' signifies that a mobile terminal device transfers a packet received from another mobile terminal device to an adjacent mobile terminal device.

2. Related Background Art

In routing protocol in an adhoc network (a so-called 'pure adhoc network') configured only by a plurality of mobile terminal devices without the requirement for equipment constituting an infrastructure for the mobile communication network, routing control based on flooding which delivers control packets of link information and so forth to all of the nodes in the network is carried out. Hence, when the number of terminals increases, control packets flow in large volumes in the network and the communication bandwidth is compressed. As a method for reducing this problem, OLSR (Optimized Link State Routing) uses an MPR (MultiPoint Relay) set (See document 'T. Clausen and P. Jacquet et al., Project Hipercom, "Optimized Link State Routing Protocol (OLSR)", RFC3626, <URL:www.ietf.org/rfc/rfc3626.txt>'). In OLSR, each terminal selects a minimum multipoint relay (MPR) that is required in order to deliver packets to all the terminals connected two hops from the terminal itself, from the terminals connected one hop from the terminal itself. When a terminal floods the whole network with packets, the packets are relayed only by the terminals which have been selected as the MPR of the terminal that transmitted the packets. As a result, it is possible to deliver packets to all the terminals two hops from the terminal that transmitted the packets originally. In addition, the terminals selected as the MPR relay the packets, and the packets are relayed again and again. Consequently the packets are delivered to the whole network. Thus, in OLSR, by performing flooding efficiently, routing with a small overhead is implemented.

SUMMARY OF THE INVENTION

However, in OLSR, although an efficiency for the control packet flooding has been considered, an optimization through the selection of the link information required for routing has not been considered. In OLSR, a terminal selected as the MPR by at least one terminal floods link information between the terminal itself and the at least one terminal. And link information on the whole network is reported to all the terminals and routing control is performed by using the link information. Here, the link information is configured by the ID of the terminal itself and the ID of the adjacent terminal. And the link information indicates that there is a link between the terminal itself and the adjacent terminal.

Thereupon, when two terminals A and B select each other as the MPR, terminals A and B perform mutual ID flooding and, therefore, the link information between the terminals A and B is transmitted in duplicate. Further, when a terminal C selects a plurality of terminals as an MPR, the plurality of terminals flood ID of the terminal C. Consequently unnecessary link information that will not be actually used is also transmitted. Thus, in OLSR, duplicate link information and link information that is not used for the route are transmitted unnecessarily to all the terminals and, as a result, the control packet amount used for the routing increases and there has been the problem that the routing overhead is large.

Therefore, an object of the present invention is to reduce the control packet amount used for the routing and to implement routing with a small overhead.

In order to solve the above problem, the mobile terminal device of the present invention is a mobile terminal device in an environment where an adhoc network is formed by a plurality of mobile terminal devices, comprising: clustering module which identifies the ID and state of another mobile terminal device that is adjacent to the mobile terminal device itself by sending and receiving a packet containing the ID and state of the mobile terminal device itself to and from another mobile terminal device, and which sets the state of the mobile terminal device itself as a cluster head, gateway or member on the basis of the state of the adjacent mobile terminal device and the state of the mobile terminal device itself; storage module for storing the ID and state of the adjacent mobile terminal device that is identified by the clustering module as well as the state of the mobile terminal device itself; link information transmit/receive module which transmits link information comprising the stored IDs of one or more of the adjacent mobile terminal devices and the ID of the mobile terminal device itself when the state of the mobile terminal device itself which is stored by the storage module is the cluster head and which receives the link information transmitted from the other mobile terminal device irrespective of the stored state of the mobile terminal device itself; and routing module which finds the route to any mobile terminal device on the basis of the link information transmitted and received by the link information transmit/receive module.

According to the present invention, although only the cluster heads transmit link information, each of the gateways and members is able to receive link information from an adjacent cluster head. Hence, the respective mobile terminal devices are able to obtain link information and determine the route to any terminal based on the link information. Thus, because there is no requirement for all the mobile terminal devices to transmit link information and it is sufficient for the cluster head alone to transmit the link information, the result is that the volume of link information required for routing (link information that is transmitted and received) can be reduced and routing with a small overhead can be implemented by reducing the control packet amount.

Further, more specifically, the clustering module is desirably configured to set the state of the mobile terminal device itself as the cluster head, gateway, or member, so as to constitute a cluster that is characterized in that the cluster heads are not adjacent with each other, the designation is made that a member is adjacent to a cluster head and belongs to only one cluster head, and the cluster heads are connected by only one gateway.

As the method for determining the above state, it is desirable that the clustering module is configured to transmit and receive control information containing the ID of the mobile terminal device itself, the state of the mobile terminal device itself, and ID information of a mobile terminal device designated as the parent by the mobile terminal device itself;

is configured to store the received control information in the storage module;

is configured to determine the state of the mobile terminal device itself as the member, when the ID of a mobile terminal device the state of which is the cluster head exists in the stored control information;

is configured to determine the state of the mobile terminal device itself as the cluster head, when the ID of a mobile terminal device the state of which is the cluster head does not exist in the stored control information and the ID of a mobile terminal device which is the gateway exists in the stored control information;

is configured to determine the state of the mobile terminal device itself as the cluster head, when neither the ID of a mobile terminal device the state of which is the cluster head nor the ID of a mobile terminal device the state of which is the gateway exists in the stored control information; and is configured to change the state of the mobile terminal device itself to the gateway when the state of the mobile terminal device itself is the member and the ID of the mobile terminal device which designates the mobile terminal device itself as the parent and the state of which is the cluster head exists in the stored control information. Further, it is desirable that the clustering module is configured to initialize the state of the mobile terminal device itself upon deletion of the ID of the mobile terminal device designated as the parent by the mobile terminal device itself from the stored control information; and is configured to reference the stored control information and initialize the state of the mobile terminal device itself, upon initialization of the state of the mobile terminal device designated as the parent by the mobile terminal device itself. As a result, it is possible to constitute clusters in accordance with the movement of the mobile terminal devices.

Further, the link information transmit/receive module is desirably configured to transmit link information comprising the ID of a gateway that is adjacent to the mobile terminal device itself, the ID of a member designating the mobile terminal device itself as the parent, and the ID of the mobile terminal device itself, as the transmitted link information. In other words, the link information transmitted by the link information transmit/receive module need not contain the ID of the mobile terminal device itself and the IDs of all the adjacent mobile terminal devices and may instead be configured by (1) the ID of the mobile terminal device itself, (2) the ID of the gateway adjacent to itself, and (3) the ID of the member designated as belonging to the mobile terminal device itself, in which case a result that permits a reduction in the data amount of the link information required for routing is obtained.

Furthermore, the link information transmit/receive module desirably transfers the link information received from another mobile terminal device when the state of the mobile terminal device itself stored by the storage module is the cluster head or gateway. In other words, because a member is adjacent to any cluster head, if a member does not transfer link information and cluster heads and a gateway connecting the cluster heads transfer link information, all the mobile terminal devices are able to receive link information. Hence, in this case, a result where the number of relays required to transfer the link information to all the mobile terminal devices can be reduced is obtained.

In addition, the present invention, which relates to a mobile terminal device can be described as an invention relating to a control method as detailed hereinafter and the invention relating to a control method affords the same actions and effects.

That is, the control method according to the present invention is a control method that is executed by a mobile terminal device in an environment where an adhoc network is formed by a plurality of the mobile terminal devices, comprising: a clustering step of identifying the ID and state of a mobile terminal device that is adjacent to the mobile terminal device itself by sending and receiving a packet containing the ID and state of the mobile terminal device itself to and from another mobile terminal device, and setting the state of the mobile terminal device itself as a cluster head, gateway or member on the basis of the state of the adjacent mobile terminal device and the state of the mobile terminal device itself; a storing step of storing the ID and state of the adjacent mobile terminal device that is identified in the clustering step as well as the state of the mobile terminal device itself; a link information transmit/receive step of transmitting link information comprising the stored IDs of one or more of the adjacent mobile terminal devices and the ID of the mobile terminal device itself when the state of the mobile terminal device itself which is stored in the storing step is the cluster head and of receiving the link information transmitted from the other mobile terminal device irrespective of the stored state of the mobile terminal device itself; and a routing step of finding the route to any mobile terminal device on the basis of the link information transmitted and received in the link information transmit/receive step.

The present invention can also be perceived as an invention relating to a mobile communication system comprising a topology management device and a plurality of mobile terminal devices. That is, the mobile communication system according to the present invention is a mobile communication system, comprising:

(1) a plurality of the mobile terminal devices, each of the mobile terminal devices comprising: clustering module which identifies the ID and state of a mobile terminal device that is adjacent to the mobile terminal device itself by sending and receiving a packet containing the ID and state of the mobile terminal device itself to and from another mobile terminal device, and which sets the state of the mobile terminal device itself as a cluster head, gateway or member on the basis of the state of the adjacent mobile terminal device and the state of the mobile terminal device itself; storage module for storing the ID and state of the adjacent mobile terminal device that is identified by the clustering module as well as the state of the mobile terminal device itself; link information transmit/receive module which transmits link information comprising the stored IDs of one or more of the adjacent mobile terminal devices and the ID of the mobile terminal device itself when the state of the mobile terminal device itself which is stored by the storage module is the cluster head, and which receives the link information transmitted from the other mobile terminal device irrespective of the stored state of the mobile terminal device itself; and routing module which finds the route to any mobile terminal device on the basis of the link information transmitted and received by the link information transmit/receive module; and (2) a topology management device that has link information receiving module for receiving link information that comprises the ID of the mobile terminal device and the IDs of one or more mobile terminal devices that are adjacent to the mobile terminal device, and list supplying module for determining a list of the IDs of mobile terminal devices that are to serve as relays for performing communication between a plurality of mobile terminal devices on the basis of the link information and supplying the list to the mobile terminal device which constitutes the origin of the communication.

The above invention relating to a mobile communication system can also appear as an invention relating to the following control method. That is, the control method according to the present invention is a control method for a mobile communication system comprising a topology management device and a plurality of mobile terminal devices, comprising: a clustering step in which the respective mobile terminal devices identify the ID and state of a mobile terminal device that is adjacent to the mobile terminal device itself by sending and receiving a packet containing the ID and state of the mobile terminal device itself to and from another mobile terminal device, and set the state of the mobile terminal device itself as a cluster head, gateway or member on the basis of the state of the adjacent mobile terminal device and the state of the mobile terminal device itself; a storing step in which the respective mobile terminal devices store the ID and state of the adjacent mobile terminal device that is identified in the clustering step as well as the state of the mobile terminal device itself; a link information transmitting step in which the respective mobile terminal devices transmit, to the topology management device, link information comprising the stored IDs of one or more of the adjacent mobile terminal devices and the ID of the mobile terminal device itself when the state of the mobile terminal device itself stored in the storing step is the cluster head; a link information receiving step in which the topology management device receives the link information; and a list supplying step in which the topology management device determines a list of the IDs of mobile terminal devices which are to serve as relays for performing communication between a plurality of mobile terminal devices on the basis of the received link information and supplies the list to the mobile terminal device which constitutes the origin of the communication.

In the case of the invention relating to the mobile communication system and the invention relating to the control method, only the cluster head transmits link information to the topology management device, while the topology management device determines a list of IDs of the mobile terminal devices that are to serve as relays for performing communications between a plurality of mobile terminal devices on the basis of the received link information and supplies this list to the mobile terminal devices which is the origin of the communication. As a result, the mobile terminal device which is the origin of the communication is able to obtain a list of the IDs of the mobile terminal devices that are to serve as relays and, therefore, routing can be performed on the basis of the list. In this case, the transmission of link information to the topology management device is not performed by all the mobile terminal devices but rather by the cluster head alone. Hence, the volume of link information required for routing (link information that is transmitted and received) can be reduced.

Since there is no need for all the mobile terminal devices to transmit link information and it is sufficient for only the cluster head to transmit link information, the present invention has the effect of permitting a reduction in the quantity of link information required for routing (link information which is transmitted and received) and of implementing routing with a small overhead through the reduced volume of control packets.

BRIEF DESCRIPTION OF THE DRAWINGS

FIG. 4 shows an example of an adjacent terminal table.

FIG. 6 shows an example of a routing table.

FIG. 7 shows an example of a state storage table.

FIG. 16 shows a constitutional example of link information.

DESCRIPTION OF THE PREFERRED EMBODIMENTS

First Embodiment

Figure 1:
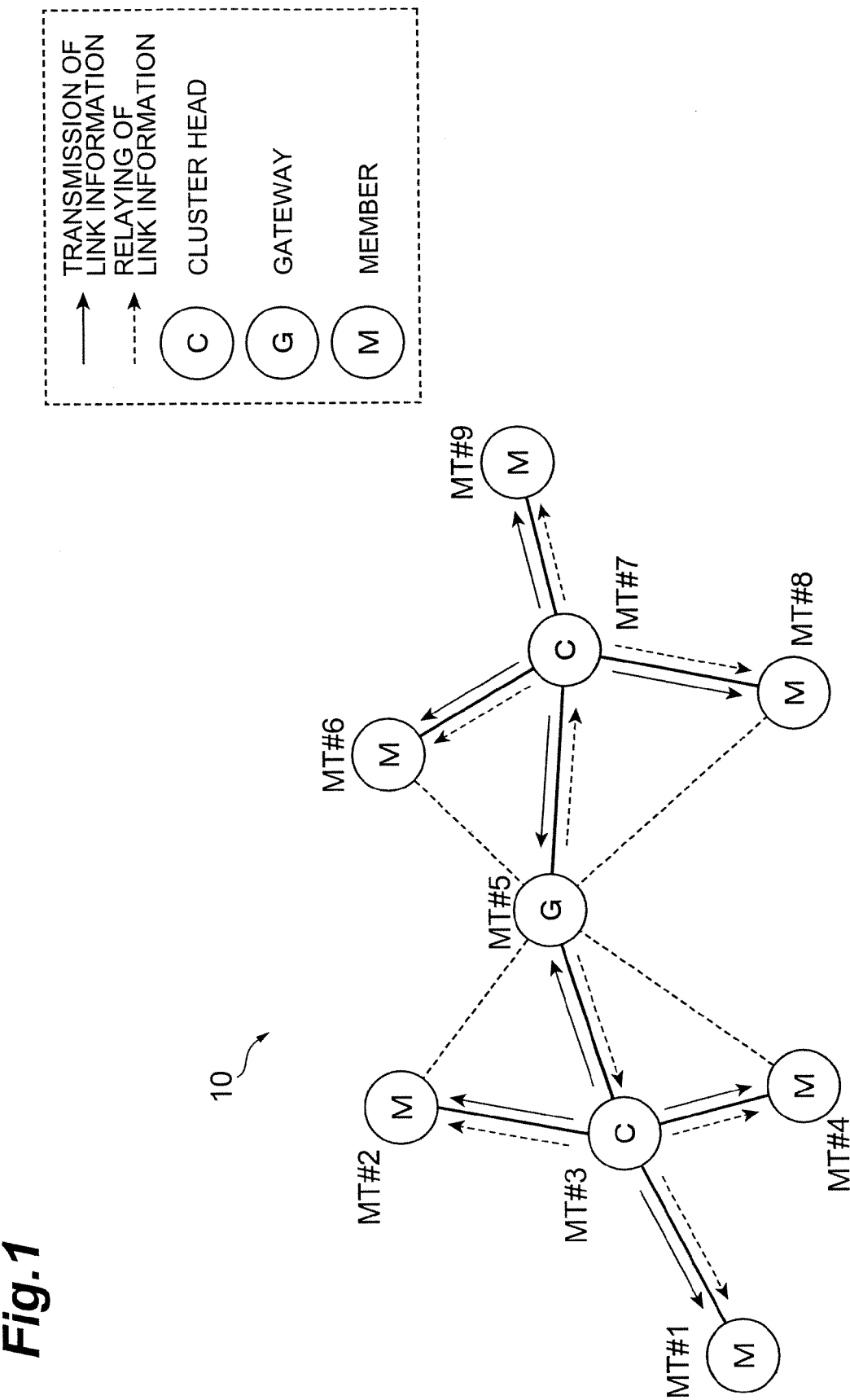
FIG. 1 is a constitutional view of the network of a mobile communication system of a first embodiment.

The constitution of the mobile communication system of the first embodiment of the present invention will now be described with reference to FIGS. 1 to 7. As shown in FIG. 1, the mobile communication system 10 according to this embodiment comprises a plurality of mobile communication terminals MT#1 to MT#9. The mobile terminal devices MT#1 to MT#9 have the same constitution and the same functions, but assume any one of three states such as 'cluster head', 'gateway' and 'member'. The states of the respective mobile terminal devices are not fixed and changed dynamically depending on the relative locational relationship with the other terminals. The states of the respective mobile terminal devices of the mobile communication system 10 are determined dynamically to satisfy the following conditions.

1. Cluster heads are not adjacent.

2. A member is adjacent to a cluster head and designates one of the adjacent cluster heads.

3. Cluster heads are connected by just one gateway.

In the example of FIG. 1, MT#3 and MT#7 are cluster heads, MT#5 is a gateway, MT#1, MT#2, MT#4, MT#6, MT#8, and MT#9 are configured as members. Further, although there are nine mobile terminal devices in FIG. 1, as long as the three conditions relating to the states of the mobile terminal device are satisfied, the number of mobile terminal devices is unlimited.

In this embodiment, a cluster head undertakes link information transmission with terminals adjacent to its own mobile terminal device (referred to as 'the mobile terminal device itself' hereinbelow). Further, upon receiving the link information transmitted by another cluster head, the cluster head or gateway transfers the received link information. As a result, all the terminals in the network are able to obtain the link information required for routing. Here, 'link information' is, for example, as shown in FIG. 16, configured by (1) the ID of the mobile terminal device itself and (2) the IDs of one or more terminals adjacent to the mobile terminal device itself and indicates that a link exists between terminals with the IDs of (1) and (2). For example, when the ID of the mobile terminal device itself is MT#5 and the IDs of the adjacent terminals are MT#3 and MT#7, this indicates that a link exists between MT#5 and MT#3 and between MT#5 and MT#7 respectively.

Figure 2:
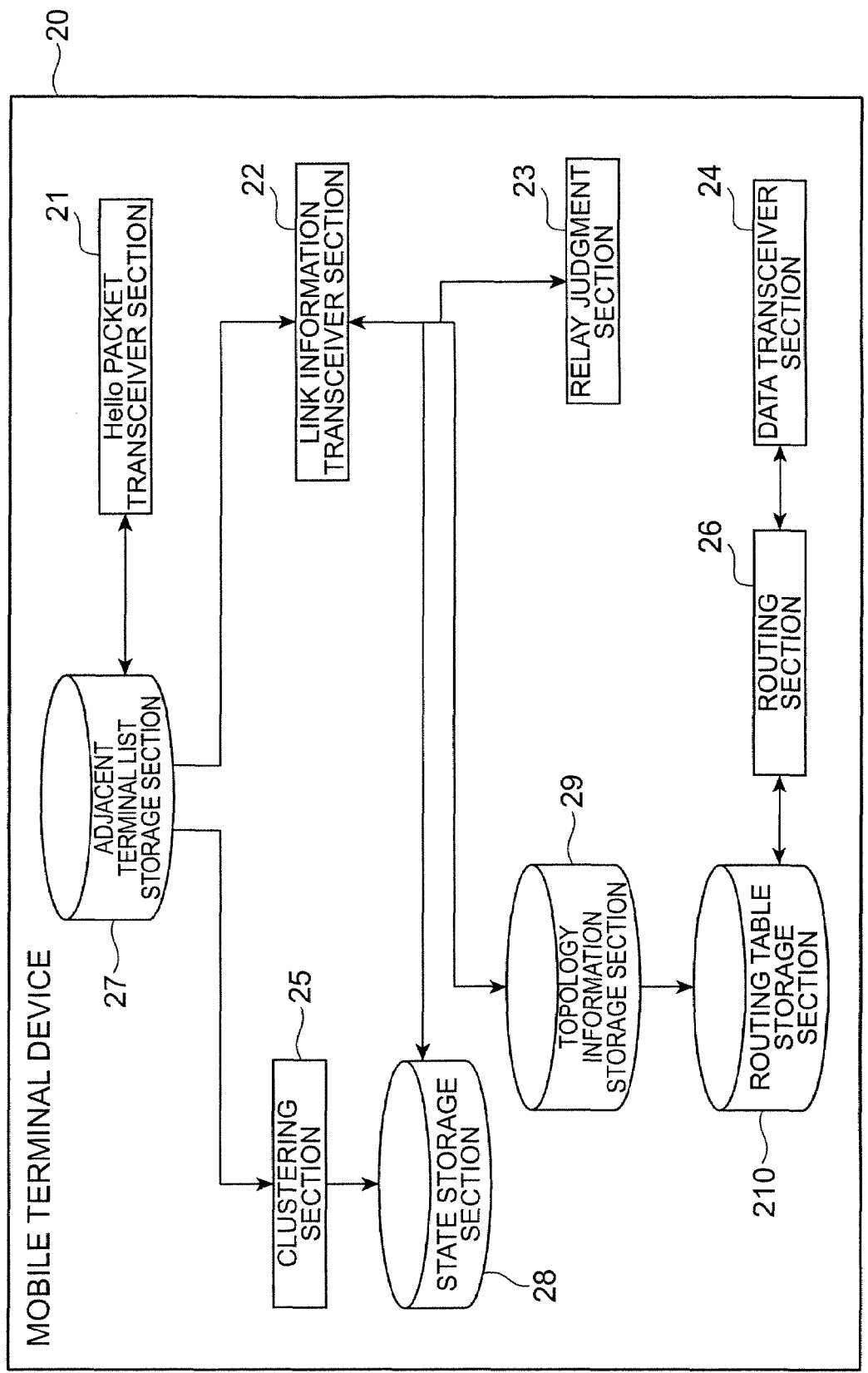
FIG. 2 is a functional block constitutional view of a mobile terminal device of the first embodiment.

The constitution of the mobile terminal devices MT#1 to MT#9 according to this embodiment (referred to collectively as 'mobile terminal device 20' hereinbelow) will be described next. FIG. 2 shows the functional block constitution of the mobile terminal device 20 of this embodiment. The mobile terminal device 20 comprises a Hello packet transceiver section 21, a link information transceiver section 22, a relay judgment section 23, a data transceiver section 24, a clustering section 25, a routing section 26, an adjacent terminal list storage section 27, a state storage section 28, a topology information storage section 29, and a routing table storage section 210. The respective constitution sections will be described in order hereinbelow.

The adjacent terminal list storage section 27 holds an adjacent terminal table 27A as per FIG. 4. The adjacent terminal table 27A contains information such as the adjacent terminal ID, the parent ID, the state of adjacent terminals, and information on whether the adjacent terminals constitute a tree.

Figure 7:
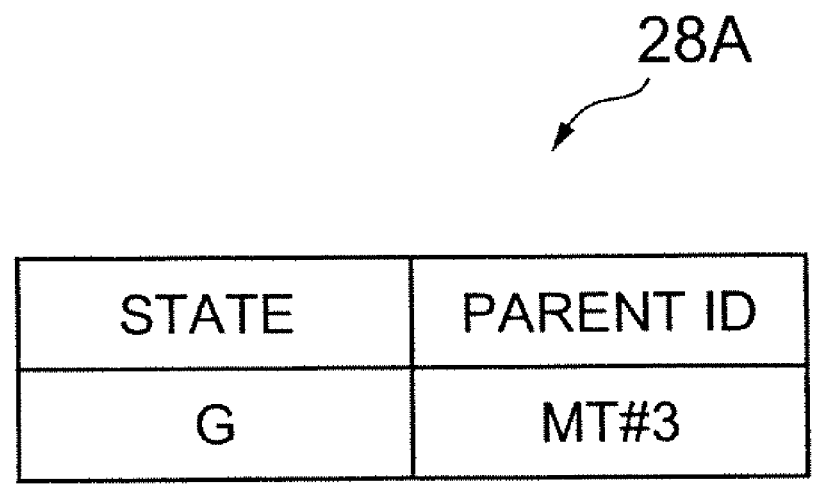

The state storage section 28 holds a state storage table 28A such as that of FIG. 7. The state storage table 28A contains information on the state and parent ID of the mobile terminal device 20.

The routing table storage section 210 holds the routing table 210A shown in FIG. 6. The routing table 210A contains the IDs of terminals other than the mobile terminal device itself and the ID of the adjacent terminal constituting the relay (Next Hop) when communication packets are transmitted to a terminal other than the mobile terminal device itself.

Figure 5:
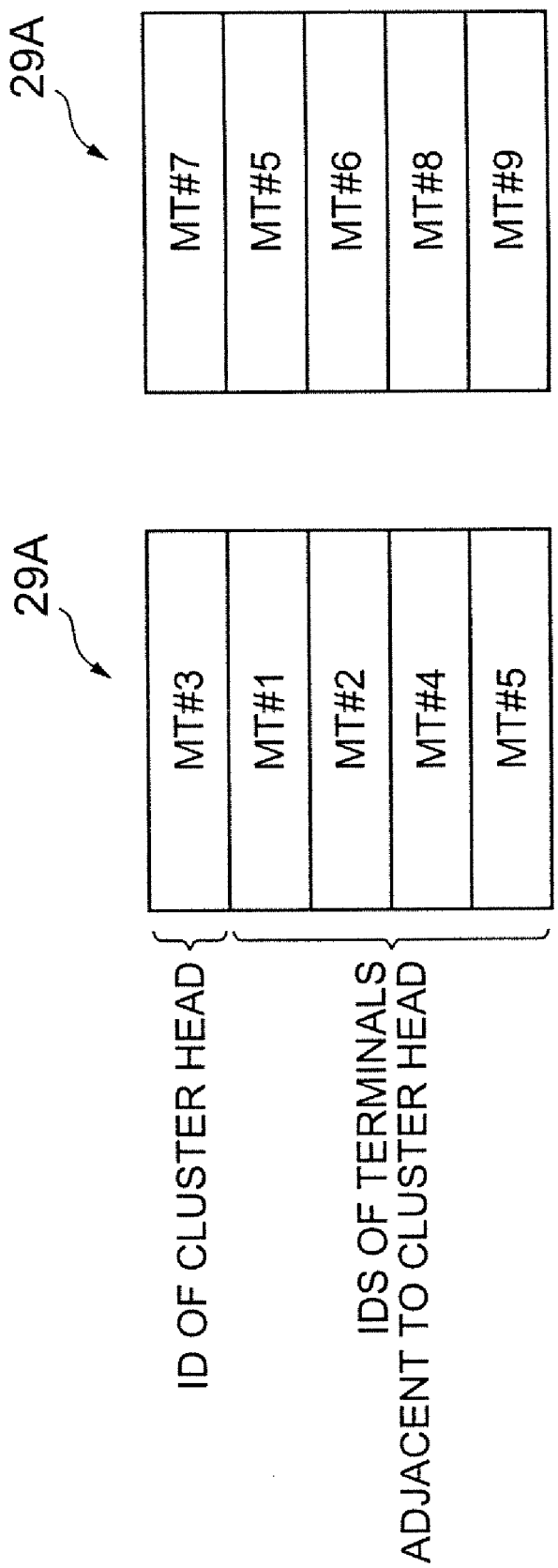
FIG. 5 shows an example of a topology table.

The topology information storage section 29 holds the topology table 29A shown in FIG. 5. The topology table 29A contains the ID of the cluster head that transmitted link information and the IDs of the terminals adjacent to the cluster head. Further, the topology information storage section 29 is configured to reference the topology table 29A, draw the routing table 210A, and store same in the routing table storage section 210. Methods of seeking the routing table 210A from the topology table 29A include the Dijkstra method, for example.

The Hello packet transceiver section 21 is configured to transmit a Hello packet at fixed intervals or receive a Hello packet from another terminal. The Hello packet transceiver section 21 inputs the ID of the mobile terminal device itself, the state of the mobile terminal device itself, and the ID of a terminal for which the mobile terminal device itself is the parent to the Hello packet and transmits same by way of a broadcast at fixed intervals. Here, a 'broadcast' refers to a communication state where the destination terminal is not decided and all the terminals capable of receiving a transmission packet receive the transmission packet. Four types of state which are 'cluster head (H)', 'gateway (G)', 'member (M)', and no state (-)' exist for the terminal. In addition, the Hello packet transceiver section 21 receives a Hello packet transmitted by another terminal and stores the ID of the other terminal, the state of the other terminal, and the ID of the parent terminal of the other terminal in the adjacent terminal table 27A in the adjacent terminal list storage section 27. Thus, the respective mobile terminal device 20 is able to grasp the existence of terminals adjacent to the mobile terminal device itself, the states of the adjacent terminals, and the ID of the parent terminal designated by the adjacent terminals.

The link information transceiver section 22 is constitute to flood link information at fixed intervals and receive link information transmitted by another terminal or transfer the link information received from the other terminal. Here, 'flooding' refers to a communication state where a plurality of terminals delivers packets to all the terminals by transferring packets transmitted by other terminals. The link information transceiver section 22 references the state storage table 28A in the state storage section 28 and, when the state of the mobile terminal device itself is the cluster head, references the adjacent terminal table 27A in the adjacent terminal list storage section 27 and performs flooding of link information constituting the a tree. Here, 'tree' refers to topology in which all the terminals are vertices and a link between the cluster head and gateway and a link between a member and the cluster head designated as the parent by the member are the sides. Here, when the member is adjacent to a plurality of cluster heads, only a link between just one cluster head is configured as an element of the tree. For example, in the case of FIG. 1, the tree is configured by nine terminals which are terminals MT#1 to MT#9, and eight links linking the terminals which are the links MT#1-MT#3, MT#2-MT#3, MT#3-

MT#4, MT#3-MT#5, MT#5-MT#7, MT#6-MT#7, MT#7-MT#8, and MT#7-MT#9. That is, the four links MT#2-MT#5, MT#4-MT#5, MT#5-MT#6, and MT#5-MT#8 actually exist but are not contained in the tree. Whether a link is contained in the tree is managed by the adjacent terminal table 27A of FIG. 4. In an adjacent terminal table 27A, when the constituent entry of the tree is 'Y', the link is contained in the tree, whereas, when the constituent entry of the tree is 'N', the link is not contained in the tree. Further, upon receipt of the link information from another terminal, the link information transceiver section 22 stores link information in the topology table 29A in the topology information storage section 29. In addition, the link information transceiver section 22 issues an inquiry to the relay judgment section 23 to inquire whether the received link information is transferred. The link information transceiver section 22 transfers the received link information in the event of a relay instruction from the relay judgment section 23.

The relay judgment section 23 is configured to reference the state storage table 28A in the state storage section 28 when an inquiry is made with regard to whether link information is transferred from the link information transceiver section 22, and issue a transfer instruction to the link information transceiver section 22 when the state of the mobile terminal device itself is the cluster head or gateway. However, even when the state of the mobile terminal device itself is the cluster head or gateway, a transfer instruction is not issued in the case of link information that is the same as link information received in the past.

The data transceiver section 24 is configured to transmit, receive, or transfer, via a unicast, communication packets such as data communication and speech calls and so forth that are made between terminals. Here, 'unicast' is a form of communication whereby a communication partner terminal is designated and packets are only delivered to the designated communication partner terminal. When communication packets are transmitted, the data transceiver section 24 issues an inquiry to the routing section 26 to inquire after the ID of the adjacent terminal which constitutes a relay terminal for delivering the communication packets to the destination terminal and transmits communication packets to the terminal with this ID. Upon receipt of the communication packets from the other terminal, the data transceiver section 24 issues an inquiry to the routing section 26 to inquire after the ID of an adjacent terminal to which the communication packets received are to be transferred. When there is an ID response from the routing section 26, communication packets are transferred to the terminal with this ID.

The clustering section 25 is configured to reference the adjacent terminal table 27A in the adjacent terminal list storage section 27, determine the state of the mobile terminal device itself, and the terminals constituting the tree, store the state of the mobile terminal device itself in the state storage table 28A in the state storage section 28 and store the terminals constituting the tree in the adjacent terminal table 27A in the adjacent terminal list storage section 27. When the mobile terminal device 20 newly participates in the network, in cases where one or a plurality of cluster heads exist among the terminals stored in the adjacent terminal table 27A, the clustering section 25 stores one of the cluster heads in the adjacent terminal table 27A as a terminal that constitutes the tree, stores same in the state storage table 28A as the parent, and determines the state of the mobile terminal device itself as being the member and stores the state of the mobile terminal device itself in the state storage table 28A as the member. Further, when a cluster head does not exist among the terminals stored in the adjacent terminal table 27A and one or a plurality of gateways exist, the clustering section 25 stores one of the gateways in the adjacent terminal table 27A as a terminal constituting the tree, stores same in the state storage table 28A as the parent, determines the state of the mobile terminal device itself as the cluster head, and stores the state thereof in the state storage table 28A as the cluster head. In addition, when a member does not exist among the terminals stored in the adjacent terminal table 27A, the clustering section 25 stores one of the members in the adjacent terminal table 27A as a terminal constituting the tree, stores same in the state storage table 28A as the parent, determines the state of the mobile terminal device itself as the cluster head, and stores the state thereof in the state storage table 28A as the cluster head. Further, even when the state of the mobile terminal device itself is the member (M), when a terminal the state of which is the cluster head (H) and for which the mobile terminal device itself has been designated as the parent exists among the terminals stored in the adjacent terminal table 27A, the clustering section 25 changes the state of the mobile terminal device itself to the gateway and stores this state in the state storage table 28A as the gateway. In addition, the clustering section 25 initializes the state of the mobile terminal device itself upon elimination of the ID of the terminal for which the mobile terminal device itself has been designated. Furthermore, the clustering section 25 references the state storage table 28A and, upon initialization of the state of the terminal for which the mobile terminal device itself has been designated, initializes the state of the mobile terminal device itself. As a result of the operation of the clustering section 25 mentioned earlier, a topology (cluster) with the characteristic that (1) the cluster heads are not adjacent to one another, (2) a member is adjacent to a head, (3) the cluster heads are connected by means of just one gateway is formed.

In this embodiment, the operation of the clustering section 25 is an example for constituting clusters and clusters may be configured by means of another operation.

The routing section 26 is configured to receive a request of the data transceiver section 24 and, by referencing the routing table 21OA in the routing table storage section 210, reports the ID of the adjacent terminal that relays the communication packets to the data transceiver section 24. The routing section 26 reports the ID of the Next Hop of the destination terminal of the communication packets to the data transceiver section 24.

The Hello packet transceiver section 21 and clustering section 25 in FIG. 2 correspond to the clustering module according to the present invention and the adjacent terminal list storage section 27 and state storage section 28 correspond to the storage module according to the present invention. Further, the link information transceiver section 22 and relay judgment section 23 correspond to the link information transceiver module according to the present invention and the routing section 26, topology information storage section 29, and routing table storage section 210 correspond to the routing module according to the present invention.

Figure 3:
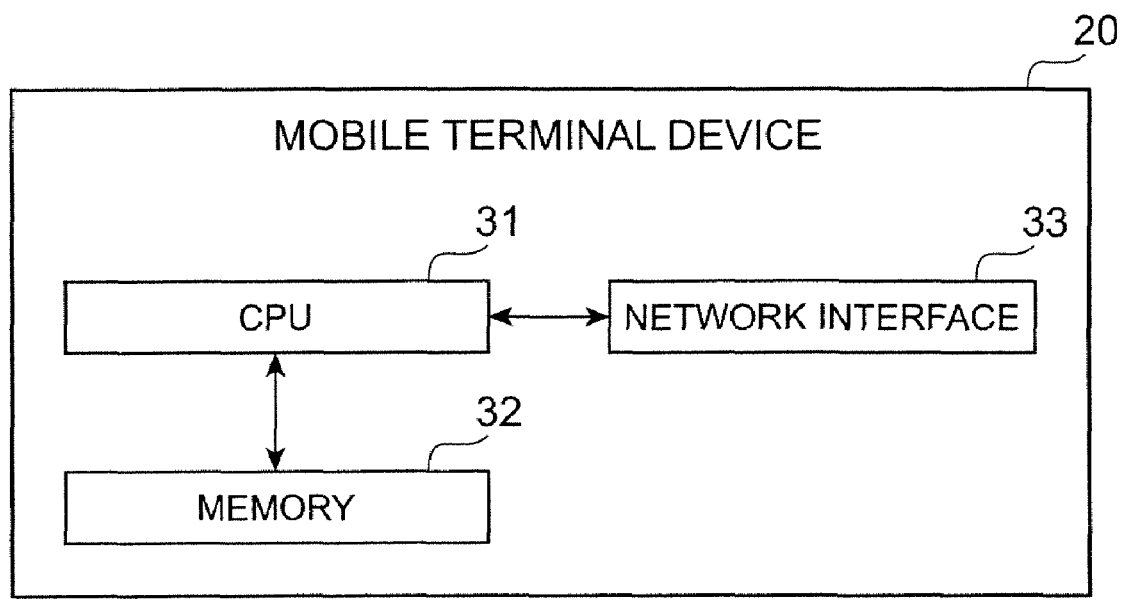
FIG. 3 is a hardware constitutional view of the mobile terminal device of the first embodiment.

The hardware constitution of the mobile terminal device 20 of this embodiment will be described next by using FIG. 3. The mobile terminal device 20 is configured to include a CPU 31, memory 32, and a network interface 33. The Hello packet transceiver section 21 in FIG. 2 is implemented by the CPU 31 and network interface 33. The link information transceiver section 22 is implemented by the CPU 31 and network interface 33. The relay judgment section 23 is implemented by the CPU 31. The data transceiver section 24 is implemented by the CPU 31 and network interface 33. The clustering section 25 is implemented by the CPU 31. The routing section 26 is implemented by the CPU 31. The adjacent terminal list storage section 27 is implemented by the memory 32. The state storage section 28 is implemented by the memory 32. The topology information storage section 29 is implemented by the CPU 31 and memory 32. The routing table storage section 210 is implemented by the memory 32.

The operation of the mobile terminal device of this embodiment will be described next by using FIGS. 8 to 15. The three operations of the mobile terminal device will be described in the following order: (1) the operation during cluster constitution, (2) the operation during link information transmission, (3) the operation during communication packet transmission.

Figure 11:
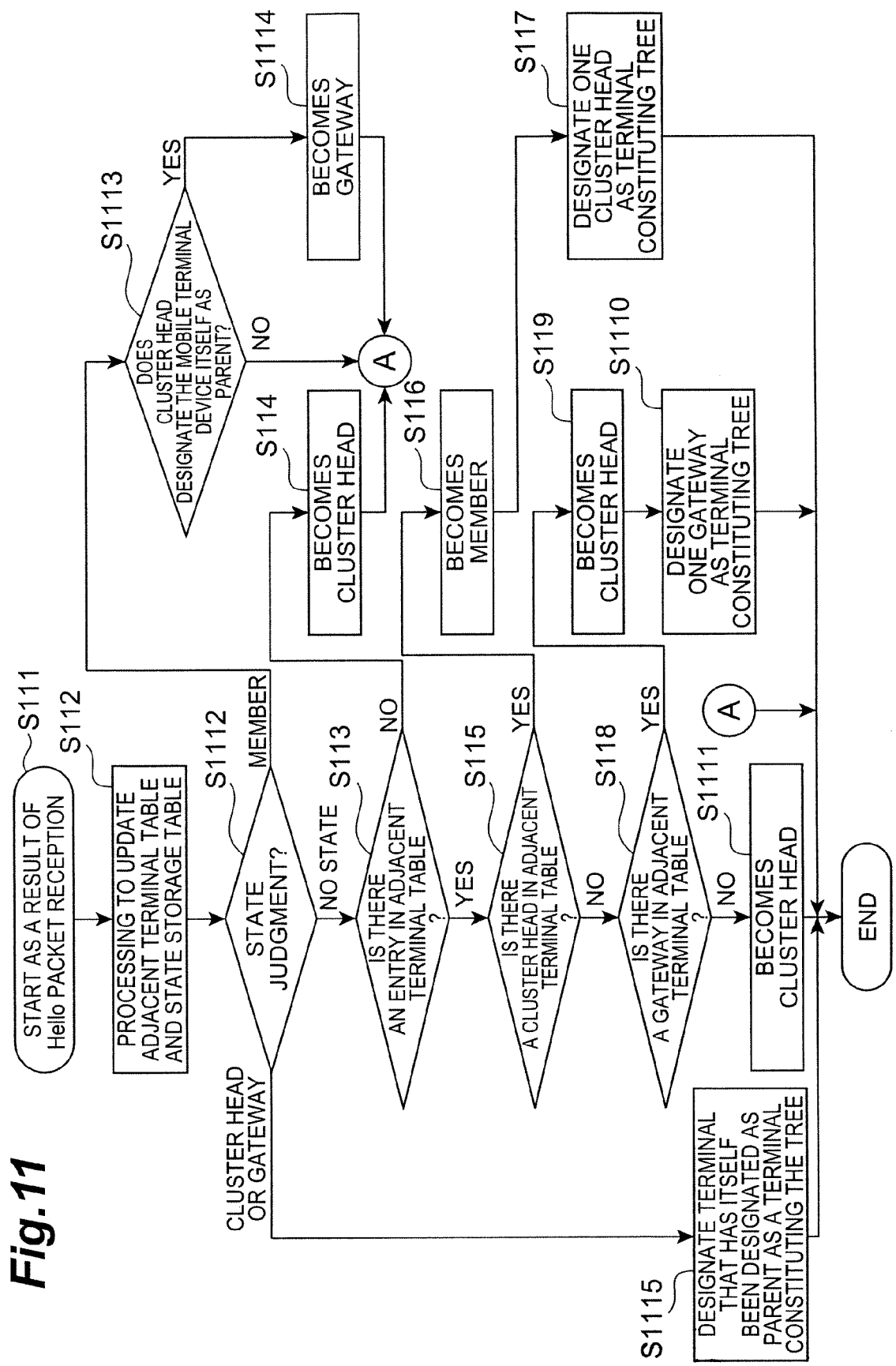
FIG. 11 shows the operation sequence of the mobile terminal device during the cluster constitution of the first and second embodiments.

First, (1) the operation of the mobile terminal device during cluster constitution will be described by using FIG. 11. The mobile terminal device 20 transmits a Hello packet at fixed intervals upon participation in the mobile communication system 10 and therefore receives the Hello packet from another terminal. Upon receipt of the Hello Packet from the other terminal (S111), the mobile terminal device 20 starts the processing of FIG. 11 and first updates the adjacent terminal table 27A by means of the Hello packet thus received (S112). Here, the Hello packet contains the ID and state of the terminal that transmitted the Hello packet and the ID of the parent terminal and adds same to the adjacent terminal ID, state and parent ID entries in the adjacent terminal table 27A. When the same ID exists in the adjacent terminal ID entry, only the terminal state and parent ID entries are updated. Further, once a Hello packet is not received within a fixed time from the terminal written in the adjacent terminal ID entry of the adjacent terminal table 27A, the entry for this terminal is deleted from the adjacent terminal table 27A. Thereupon, when the state storage table 28A has been referenced and the terminal designated as the parent has been deleted from the adjacent terminal table 27A, the state of the mobile terminal device itself is neither the cluster head nor gateway nor member. The state of the mobile terminal device itself 'no state (-)' and parent ID 'no state (-)' are stored in the state storage table 28A. Further, when the state of the terminal designated as the parent is changed to 'no state (-)' in the adjacent terminal table 27A, the state of the mobile terminal device itself is neither the cluster head nor gateway nor member, and the state of the mobile terminal device itself 'no state (-)' and parent ID 'no state (-)' are stored in the state storage table 28A. When the topology is changed as a result of movement and so forth by updating (initializing) the state storage table 28A in this manner, the state of the mobile terminal device itself can be determined once again and the cluster can be newly configured.

Further, the mobile terminal device 20 references the state storage table 28A and judges the state of the mobile terminal device itself (S112). When the state of the mobile terminal device itself is the cluster head (H) or gateway (G), the mobile terminal device 20 references the adjacent terminal table 27A, designates the terminal for which the mobile terminal device itself has been designated as the parent as a terminal constituting the tree and updates the 'tree constitution' field for this terminal in the adjacent terminal table 27A to 'Y' (S1115). When the state of the mobile terminal device itself is member (M), the mobile terminal device 20 references the adjacent terminal table 27A and confirms whether a terminal the state of which is head (H) and for which the mobile terminal device itself is designated as the parent (parent ID entry is the ID of the mobile terminal device itself) exists among the adjacent terminals (S1113). When this terminal does not exist, the processing is terminated. When the terminal exists, the mobile terminal device itself is the cluster head (S1114). Here, the clustering section 25 stores the state of the mobile terminal device itself 'cluster head (H)' in the state storage table 28A.

When the state of the mobile terminal device itself is no state, the mobile terminal device 20 references the adjacent terminal table 27A in order to determine the state of the mobile terminal device itself and judges whether an entry exists in the adjacent terminal table 27A (S113). Here, when an entry does not exist in the adjacent terminal table 27A, this means that a mobile terminal device other than the mobile terminal device itself does not exist, thereby the state of the mobile terminal device itself becomes the cluster head (S114). Thereupon, the clustering section 25 stores the state of the mobile terminal device itself 'cluster head (H)' in the state storage table 28A.

On the other hand, when an entry exists in the adjacent terminal table 27A in S113, it is confirmed whether a cluster head exists among the adjacent terminals in the entry (S115). Here, when a cluster head exists, the mobile terminal device itself becomes a member (S116) and one terminal among the existing cluster heads is designated as a terminal that constitutes the tree (S117). The method for selecting one of the cluster heads may select the cluster head with the smallest ID, may select the cluster head with the largest ID, may select the cluster head randomly or may select the cluster head with the most stable communication. Thereupon, the clustering section 25 stores the state 'member (M)' of the mobile terminal device itself and the ID of the one terminal as the parent ID in the state storage table 28A and establishes the 'tree constitution' field related to the one terminal in the adjacent terminal table 27A as 'Y'.

However, when a cluster head does not exist in the adjacent terminal table 27A in S115, it is confirmed whether a gateway exists among the adjacent terminals in the entry (S118). Here, when a gateway exists, the mobile terminal device itself becomes the cluster head (S119), and one of the existing gateways is designated as a terminal constituting the tree (S1110). The method for selecting one of the gateways may select the gateway with the smallest ID, may select the gateway with the largest ID, may select the gateway randomly, or may select the gateway with the most stable communication. Thereupon, the clustering section 25 stores the state 'cluster head (H)' of the mobile terminal device itself and the ID of one terminal of the gateways as the parent ID in the state storage table 28A and establishes the 'tree constitution' field related to one of the gateways in the adjacent terminal table 27A as 'Y'.

However, when a gateway does not exist in the adjacent terminal table 27A in S118, the mobile terminal device itself is the cluster head (S1111) and one of the existing members is designated as the terminal constituting the tree. The method for selecting one of the members may select the member with the smallest ID, may select the member with the largest ID, may select the member randomly, or may select the member with the most stable communication. Thereupon, the clustering section 25 stores the state 'cluster head (H)' of the mobile terminal device itself and the ID of one terminal of the members as the parent ID in the adjacent terminal table 27A and establishes the 'tree constitution' field related to the designated member in the state storage table 28A as 'Y'.

Figure 8:
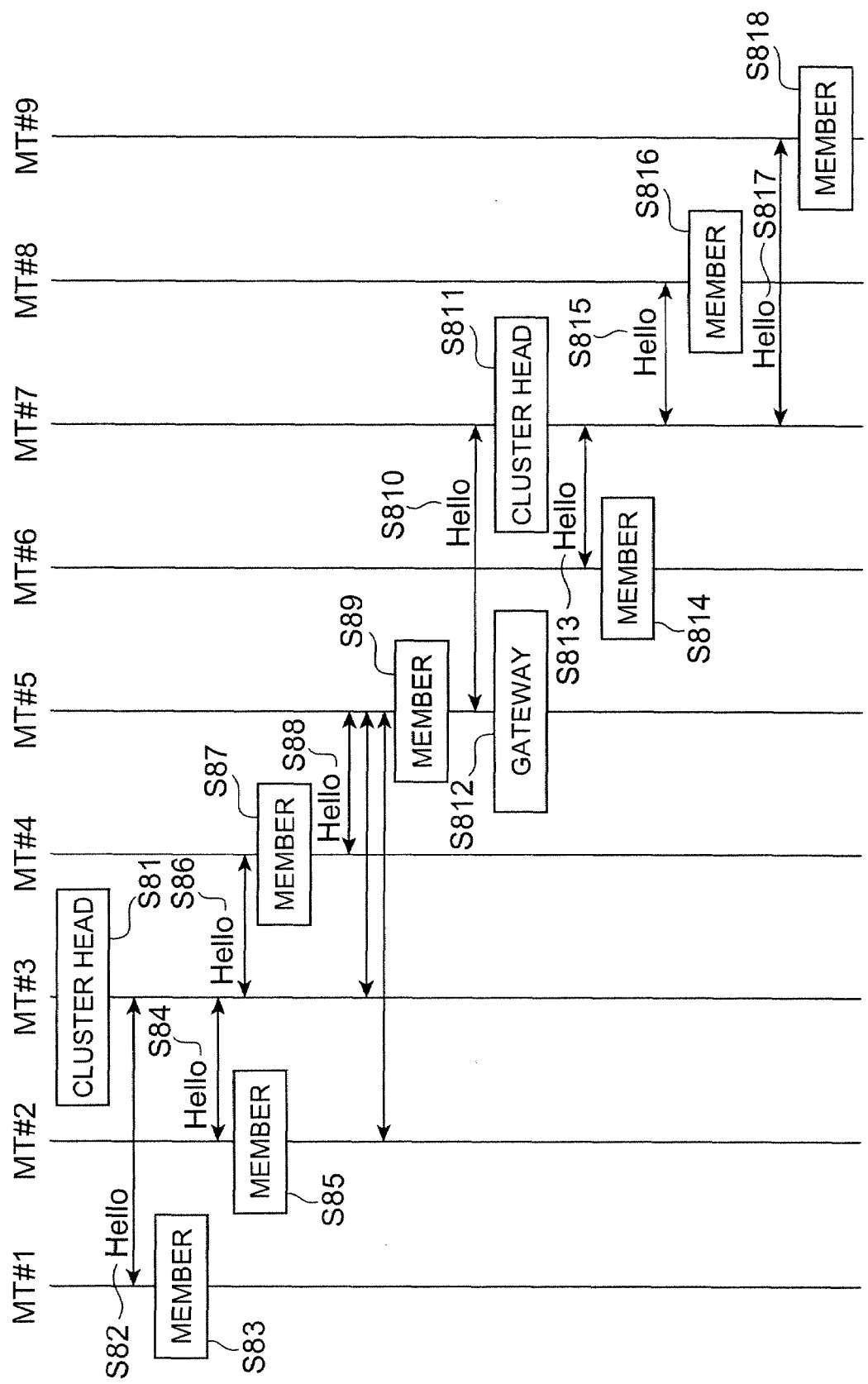
FIG. 8 shows the operation sequence of the whole mobile communication system during the cluster constitution of the first and second embodiments.

The operation sequence of the whole mobile communication system during cluster constitution will be described next using FIG. 8. Here, a case where mobile communication terminals MT#3, MT#1, MT#2, MT#4, MT#5, MT#7, MT#6, MT#8, and MT#9 participate in the network in that order will be described by way of example.

First, MT#3 participates in the network. Although MT#3 transmits a Hello packet at fixed intervals, because another terminal does not exist at that point in time, an entry does not exist in the adjacent terminal table 27A. As a result, the clustering section 25 of MT#3 stores the fact that the mobile terminal device itself is the cluster head (H) and the parent ID is no state (-) in the state storage table 28A (S81).

MT#1 then participates in the network. MT#1 exchanges a Hello packet with MT#3 (S82) and MT#3 is registered in the adjacent terminal table 27A in MT#1. Thereupon, MT#3 is the cluster head and, therefore, the clustering section 25 of the MT#1 stores member (M) as the state of the mobile terminal device itself and MT#3 as the parent ID in the state storage table 28A in the MT#1, and establishes a tree constitution entry related to the MT#3 in the adjacent terminal table 27A as 'Y' (S83). Meanwhile, MT#1 is registered in the adjacent terminal table 27A in MT#3 and the clustering section 25 of MT#3 establishes the tree constitution entry related to MT#1 in the adjacent terminal table 27A as 'Y'. As a result, at this point in time, a cluster in which MT#3 is the cluster head and MT#1 is a member is configured.

Thereafter, MT#2 participates in the network. MT#2 exchanges a Hello packet with the MT#3 (S84) and MT#3 is registered in the adjacent terminal table 27A in MT#2. Here, MT#3 is the cluster head and, therefore, the clustering section 25 of MT#2 stores member (M) as the state of the mobile terminal device itself and MT#3 as the parent ID in the state storage table 28A in MT#2 and establishes the tree constitution entry relating to MT#3 in the adjacent terminal table 27A as 'Y' (S85). On the other hand, MT#2 is registered in the adjacent terminal table 27A in MT#3 and the clustering section 25 of MT#3 establishes the tree constitution entry relating to MT#2 in the adjacent terminal table 27A as 'Y'. As a result, at this point in time, a cluster in which MT#3 is the cluster head and MT#1 and MT#2 are members is configured.

Thereafter, MT#4 participates in the network and, as a result of the same processing as the aforementioned processing, a cluster in which MT#3 is the cluster head and MT#1, MT#2, and MT#4 are members is configured (S86 to S87).

Thereafter, MT#5 participates in the network. Because MT#5 is adjacent to MT#2, MT#3, and MT#4, a Hello packet is exchanged with MT#2, MT#3, and MT#4 (S88). As a result, MT#2, MT#3, and MT#4 are registered in the adjacent terminal table 27A in the MT#5. At this point in time, because MT#3 is the cluster head, a cluster in which MT#5 is a member (S89), MT#3 is the cluster head, and MT#1, MT#2, MT#4, and MT#5 are members is configured.

MT#7 then participates in the network. MT#7 exchanges a Hello packet with adjacent MT#5 (S810) and MT#5 is registered in the adjacent terminal table 27A in MT#7. Because MT#5 is a member at this point in time, the clustering section 25 of MT#7 stores 'cluster head (H)' as the state of the mobile terminal device itself and MT#5 as the parent ID in the state storage table 28A in MT#7 and establishes the tree entry related to MT#5 in the adjacent terminal table 27A as 'Y' and the state related to MT#5 as 'gateway (G)' (S811). On the other hand, MT#7 is registered in the adjacent terminal table 27A in MT#5 and the clustering section 25 of MT#5 establishes the tree constitution entry relating to MT#7 of the adjacent terminal table 27A in MT#5 as 'Y' and the state entry of the mobile terminal device itself in the state storage table 28A as 'gateway (G)'. As a result, the state of MT#5 is changed from the member to the gateway (S812). At this point in time, a cluster in which MT#3 and MT#7 are cluster heads, MT#5 is a gateway, and MT#1, MT#2, and MT#4 are members is configured.

Thereafter, MT#6, MT#8, and MT#9 sequentially participate in the network and, as a result of performing the same processing, ultimately clusters in which MT#3 and MT#7 are cluster heads, MT#5 is a gateway, and MT#1, MT#2, MT#4, MT#6, MT#8, and MT#9 are members is configured (S813 to S818).

The operation during (2) link information transmission (link information transmission method) will be described next. Further, the operation is characterized in that the link information transmission utilizes the cluster constitution. More specifically, the cluster head transmits link information between adjacent terminals and, as a result of only the cluster head and gateway transferring the link information, it is possible to implement the transmission of the route information required for routing to all the terminals.

Figure 12:
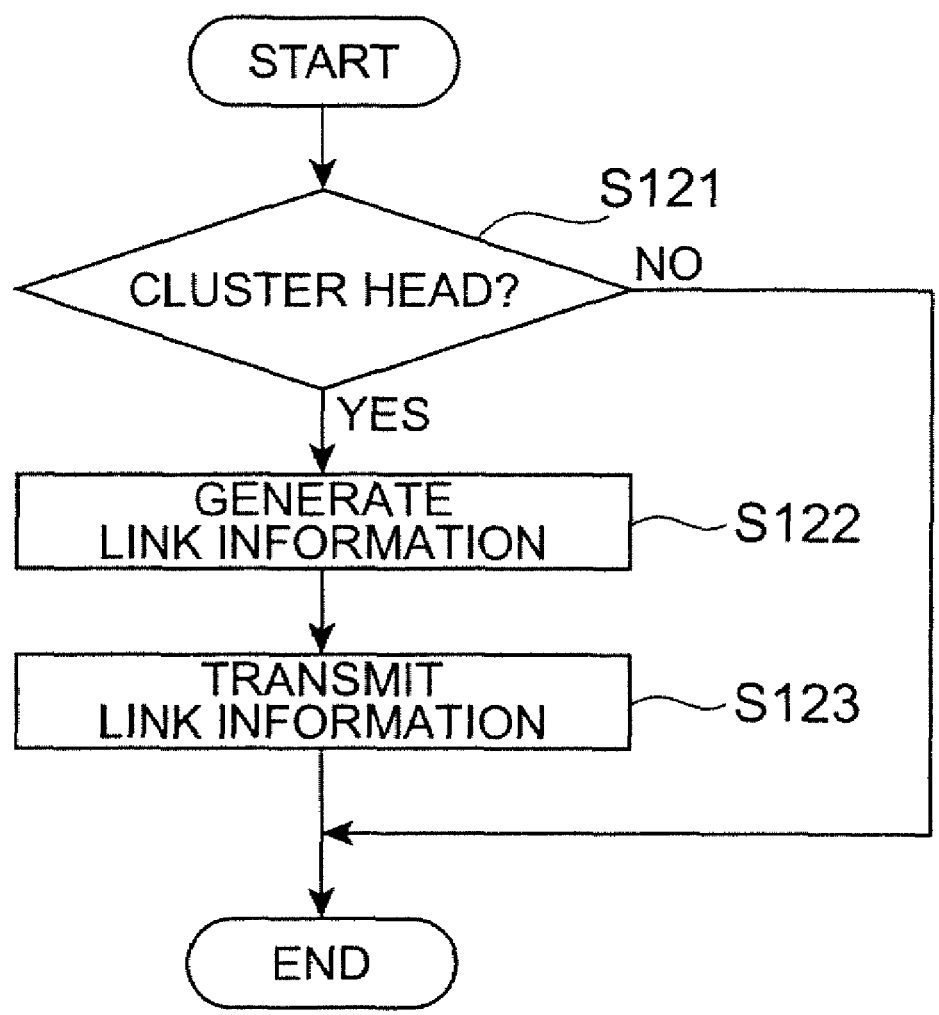
FIG. 12 shows the operation sequence of the mobile terminal device during the link information transmission of the first embodiment.

The operation of the mobile terminal device 20 during link information transmission will first be described using FIG. 12. First, the mobile terminal device 20 confirms whether the mobile terminal device itself is a cluster head by referencing the state storage table 28A (S121). Because only the cluster head is transmitted as the link information, when the mobile terminal device itself is not the cluster head in S121, the processing is terminated. However, when the mobile terminal device itself is the cluster head in S121, the mobile terminal device 20 generates link information (S122), transmits the generated link information (S123) and ends the processing.

Further, during the generation of the link information of S122, the adjacent terminal table 27A may be referenced to generate link information by listing all the adjacent terminals and link information may be generated by listing only those terminals for which the tree constitution entry is 'Y' among the adjacent terminals. When generating link information by listing only those terminals for which the tree constitution entry is 'Y', because there is no need to list all the adjacent terminals, additional results, namely, the further reduction of the data volume of the link information, are obtained.

Figure 13:
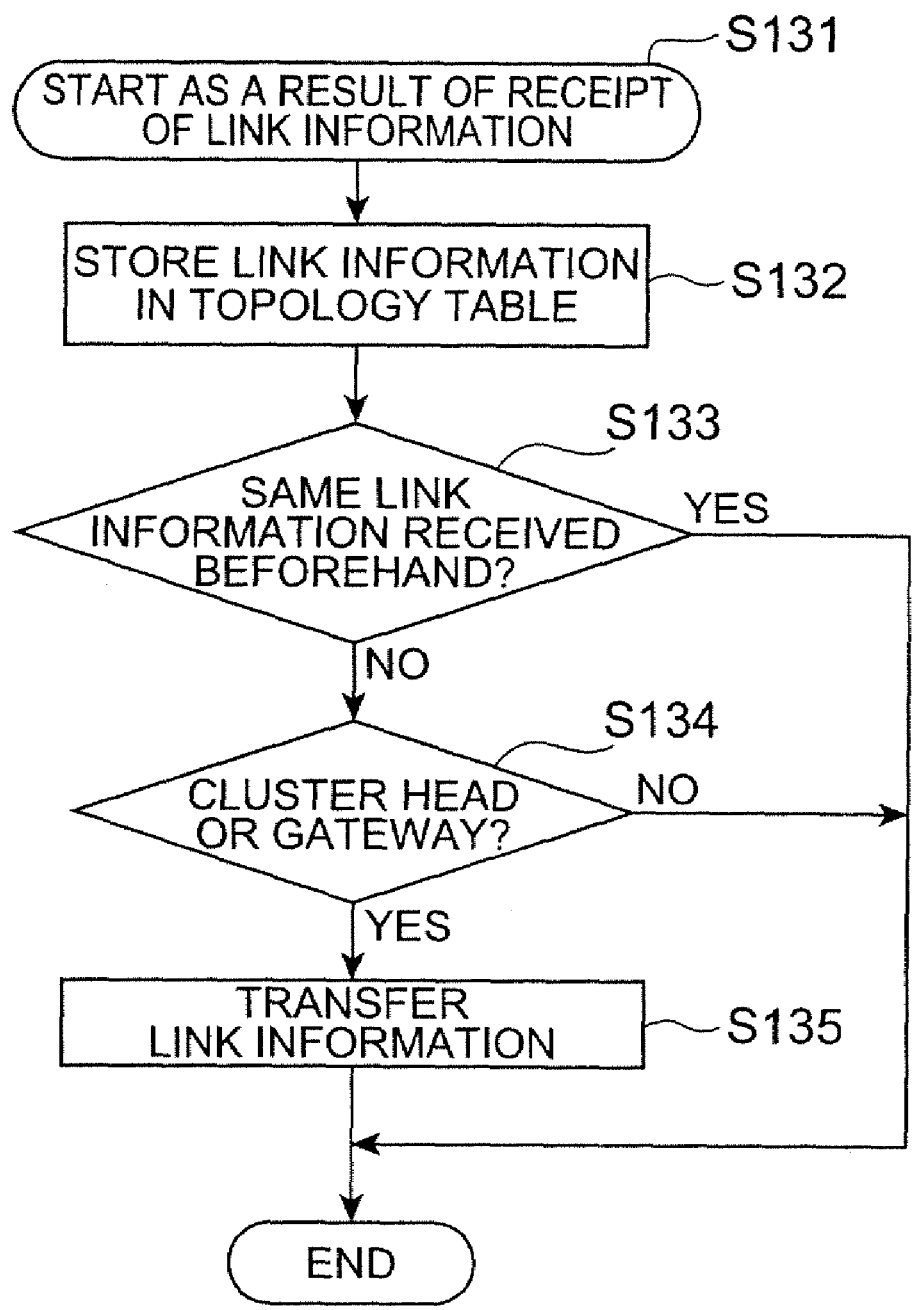
FIG. 13 shows the operation sequence of the mobile terminal device during the link information transfer of the first embodiment.

The operation of the mobile terminal device 20 during the transfer of link information will be described next using FIG. 13. Upon receipt of link information from another terminal (S131), the mobile terminal device 20 starts the processing of FIG. 13 and stores the link information thus received in the topology table 29A (S132). The mobile terminal device 20 then judges whether the received link information was received beforehand (S133). Here, when the received link information is received beforehand, the processing is ended without transferring link information. However, when the received link information is not received beforehand in S133, it is confirmed whether the mobile terminal device itself is a cluster head or a gateway by referencing the state storage table 28A (S134). When the mobile terminal device itself is a cluster head or a gateway, the received link information is transferred (S135). However, in S134, when the mobile terminal device itself is a member rather than a cluster head or a gateway, the processing is ended without transferring the link information. As mentioned earlier, the mobile terminal device 20 transfers the received link information only when the mobile terminal device itself is a cluster head or a gateway.

Figure 9:
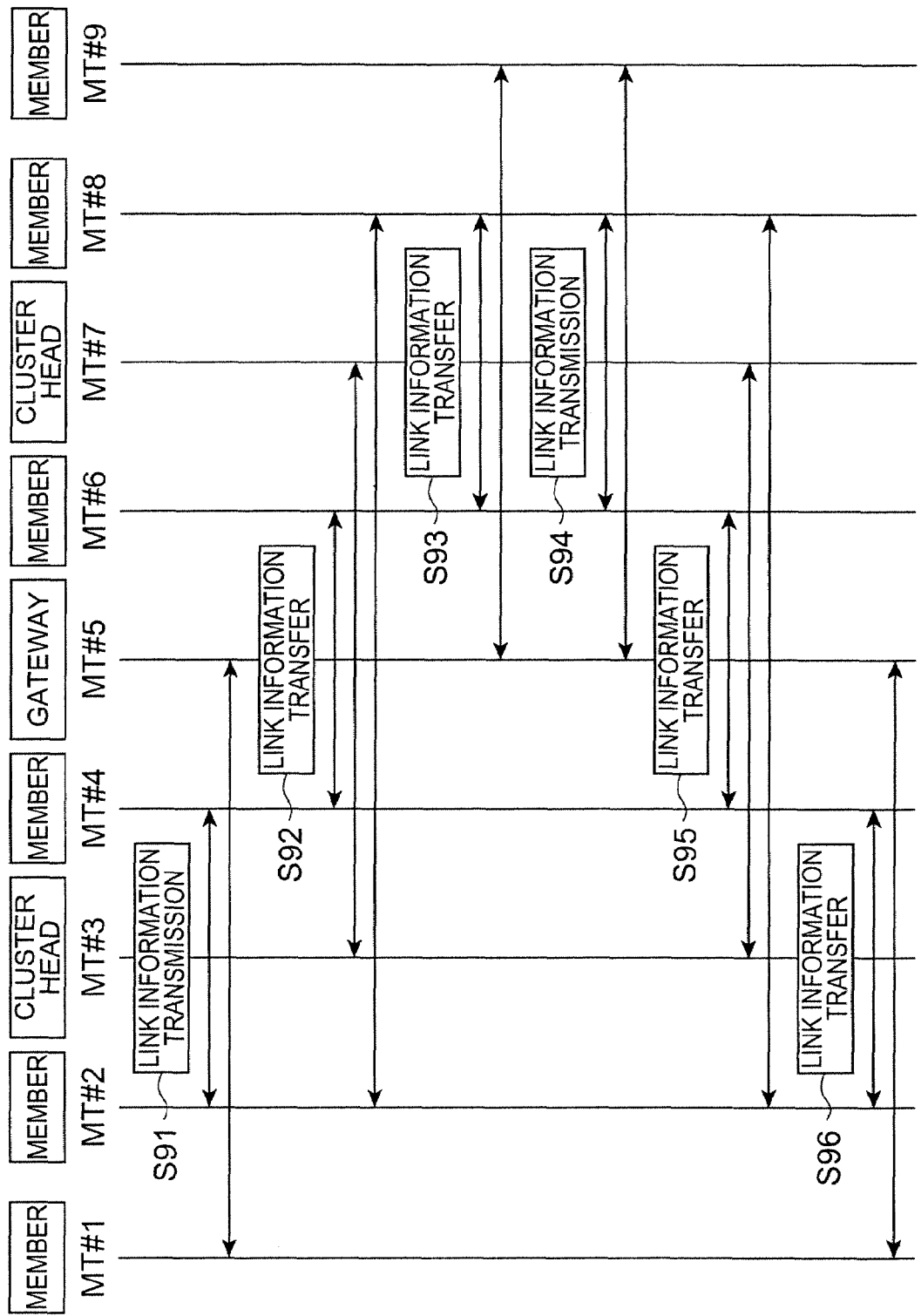
FIG. 9 shows the operation sequence of the whole mobile communication system during the link information transmission of the first embodiment.

The operation sequence of the whole mobile communication system during link information transmission will be described next using FIG. 9.

The link information transceiver section 22 of MT#3 which is a cluster head transmits link information at fixed intervals. The link information transceiver section 22 of MT#3 first references the adjacent terminal table 27A in the MT#3 and lists the adjacent terminal IDs for which the tree constitution entry is 'Y'. In this case, MT#1, MT#2, MT#4, and MT#5 are given as a list. A list to which the ID of the mobile terminal device itself (MT#3) has been added is then transmitted by way of a broadcast as link information (S91).

The transmitted link information is received by MT#1, MT#2, MT#4, and MT#5 which are adjacent to MT#3.

Here, the link information transceiver section 22 of the MT#1, MT#2, and MT#4 which are members stores link information in the topology table 29A in the mobile terminal device itself. In this case, the ID of the cluster head (MT#3) and the IDs of the terminals adjacent to the cluster head (MT#1, MT#2, MT#4 and MT#5) are stored in the topology table 29A. In addition, the link information transceiver section 22 of the MT#1, MT#2, and MT#4 issues an inquiry to relay judgment section 23 in the mobile terminal device itself to inquire whether to relay the received link information. The relay judgment section 23 which receives the inquiry references the state storage table 28A. In this case, because the entry of the state storage table 28A is 'member (M)', the relay judgment section 23 does not output the relay instruction to the link information transceiver section 22. As a result, MT#1, MT#2, and MT#4 which are members do no perform link information transfers.

However, the link information transceiver section 22 of the MT#5 which is the gateway that received the link information stores the link information in the topology table 29A. In this case, the ID of the cluster head (MT#3) and the IDs of the terminals adjacent to the cluster head (MT#1, MT#2, MT#4, and MT#5) are stored in the topology table 29A. In addition, the link information transceiver section 22 of MT#5 which is a gateway issues an inquiry to the relay judgment section 23 to inquire whether to relay the received link information. The relay judgment section 23, which receives the inquiry, references the state storage table 28A. In this case, the entry of the state storage table 28A is 'gateway (G)' and, therefore, the relay judgment section 23 issues a relay instruction to the link information transceiver section 22. The link information transceiver section 22, which receives the relay instruction, transfers the received link information by way of a broadcast (S92).

The transferred link information is received by the terminals adjacent to MT#5 which performed the transfer (MT#2, MT#3, MT#4, MT#6, MT#7, and MT#8).

The link information transceiver section 22 of MT#2, MT#4, MT#6, and MT#8 which are members among the adjacent terminals stores link information in the topology table 29A. In this case, the ID of the cluster head (MT#3) and the IDs of the terminals adjacent to the cluster head (MT#1, MT#2, MT#4, and MT#5) are stored in the topology table 29A. In addition, the link information transceiver section 22 of the MT#2, MT#4, MT#6, and MT#8 which are members issue an inquiry to the relay judgment section 23 to inquire whether to relay the received link information. The relay judgment section 23, which received the inquiry, references the state storage table 28A. In this case, the entry of the state storage table 28A is 'member (M)' and, therefore, the relay judgment section 23 does not issue a relay instruction to the link information transceiver section 22. Hence, the relay judgment section 23 does not issue a relay instruction to the link information transceiver section 22. As a result, MT#2, MT#4, MT#6, and MT#8, which are members, do not perform a link information transfer.

Furthermore, the link information transceiver section 22 of MT#3 which is the cluster head that received the link information stores the link information in the topology table 29A. In this case, the ID of the cluster head (MT#3) and the IDs of the terminals adjacent to the cluster heads (MT#1, MT#2, MT#4, and MT#5) are stored in the topology table 29A. In addition, the link information transceiver section 22 of MT#3 which is the cluster head issues an inquiry to the relay judgment section 23 to inquire whether to relay the received link information. The relay judgment section 23 that received the inquiry references the state storage table 28A. In this case, the entry of the state storage table 28A becomes 'cluster head (H)' but the received link information is the same link information as the link information transmitted all at once and the relay judgment section 23 does not issue a relay instruction to the link information transceiver section 22. As a result, MT#3, which is the cluster head, does not perform a link information transfer.

Furthermore, the link information transceiver section 22 of MT#7 which is the cluster head which has received the link information also stores the link information in the topology table 29A. In this case, the ID of the cluster head (MT#3) and the IDs of the terminals adjacent to the cluster head (MT#1, MT#2, MT#4 and MT#5) are stored in the topology table 29A. In addition, the link information transceiver section 22 of the MT#7 which is the cluster head issues an inquiry to the relay judgment section 23 to inquire whether to relay the received link information. The relay judgment section 23 that received the inquiry references the state storage table 28A. In this case, the entry of the state storage table 28A is 'cluster head (H)' and the received link information is link information that has not been transmitted even once. Hence, the relay judgment section 23 outputs a relay instruction to the link information transceiver section 22. The link information transceiver section 22 that received the relay instruction transfers the received link information by way of a broadcast (S93).

The link information thus transferred is received by the terminals adjacent to the MT#7 that performed the transfer (MT#5, MT#6, MT#8, and MT#9).

The link information transceiver section 22 of MT#6, MT#8, and MT#9 which are the members among the adjacent terminals store link information in the topology table 29A. In this case, the ID of the cluster head (MT#3) and the IDs of the terminals adjacent to the cluster heads (MT#1, MT#2, MT#4, and MT#5) are stored in the topology table 29A. In addition, the link information transceiver section 22 of MT#6, MT#8, and MT#9 which are members issues an inquiry to the relay judgment section 23 to inquire whether to relay the received link information. The relay judgment section 23 which receives the inquiry references the state storage table 28A. In this case, the entry of the state storage table 28A is 'member (M)' and, therefore, the relay judgment section 23 does not issue a relay instruction to the link information transceiver section 22. As a result, the transfer of link information is not performed.

However, the link information transceiver section 22 of MT#5 which is a gateway that received the link information stores the link information in the topology table 29A. In this case, the ID of the cluster head (MT#3) and the IDs of the terminals adjacent to the cluster head (MT#1, MT#2, MT#4, and MT#5) are stored in the topology table 29A. In addition, the link information transceiver section 22 of MT#5 which is the gateway issues an inquiry to the relay judgment section 23 to inquire whether to relay the received link information. The relay judgment section 23 which receives the inquiry references the state storage table 28A. In this case, the entry of the state storage table 28A is 'gateway (G)' and the received link information is the same as the link information transmitted all at once and, therefore, the relay judgment section 23 does not issue a relay instruction to the link information transceiver section 22. As a result, the transfer of link information is not performed.

As a result of such an operation, the link information transmitted by the cluster head MT#3 is transmitted to all the terminals MT#1 to MT#9 on the network.

In addition, as a result of the same operation, link information transmitted by the cluster head MT#7 is also transmitted to all of the terminals MT#1 to MT#9 on the network (S94 to S96).

Thus, the respective terminals are able to draw the routing table 210A on the basis of the link information by receiving link information transmitted by the MT#7 and the link information transmitted by MT#3 and are able to perform routing based on the routing table 210A thus drawn.

(3) The operation during transmission of communication packets (packets for data communication and speech calls and so forth) will be described next.

Figure 14:
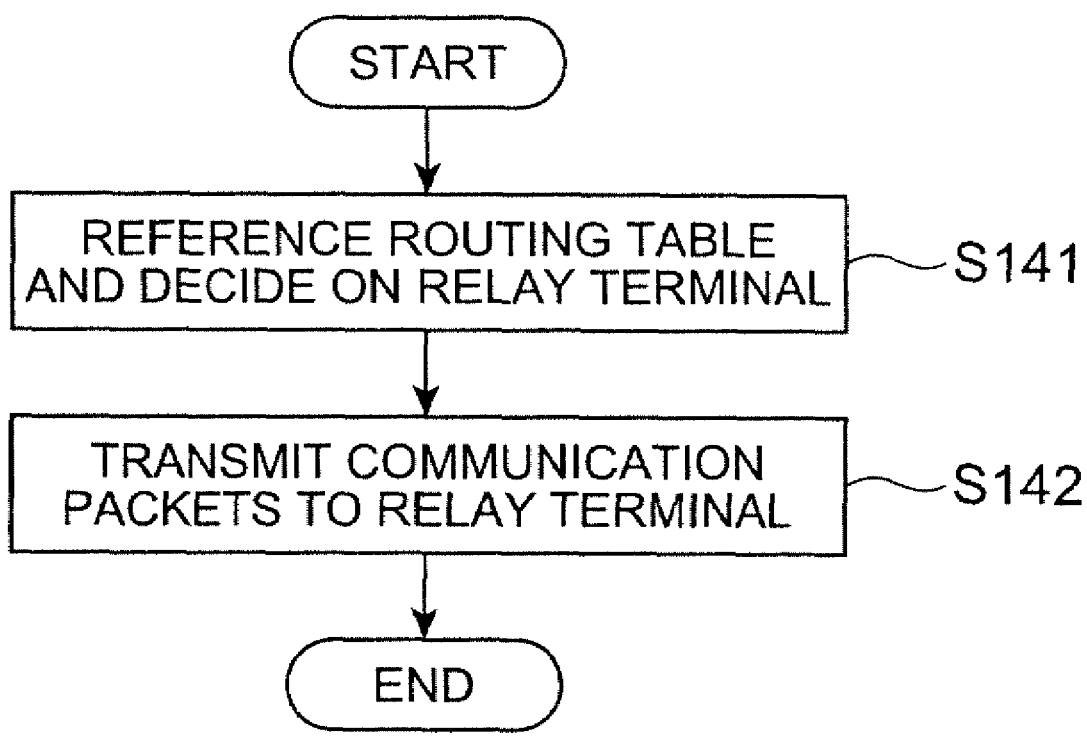
FIG. 14 shows the operation sequence of the mobile terminal device during the communication packet transmission of the first embodiment.

First, the operation of the mobile terminal device during communication packet transmission will be described using FIG. 14. When a communication packet is transmitted, the mobile terminal device 20 references the routing table 210A and confirms the ID of the adjacent terminal which is to perform relaying in order to send communication packets to the destination terminal (S142). The mobile terminal device 20 then transmits communication packets to the adjacent terminal (adjacent terminals which are to perform the relaying) obtained by way of confirmation (S143).

Figure 15:
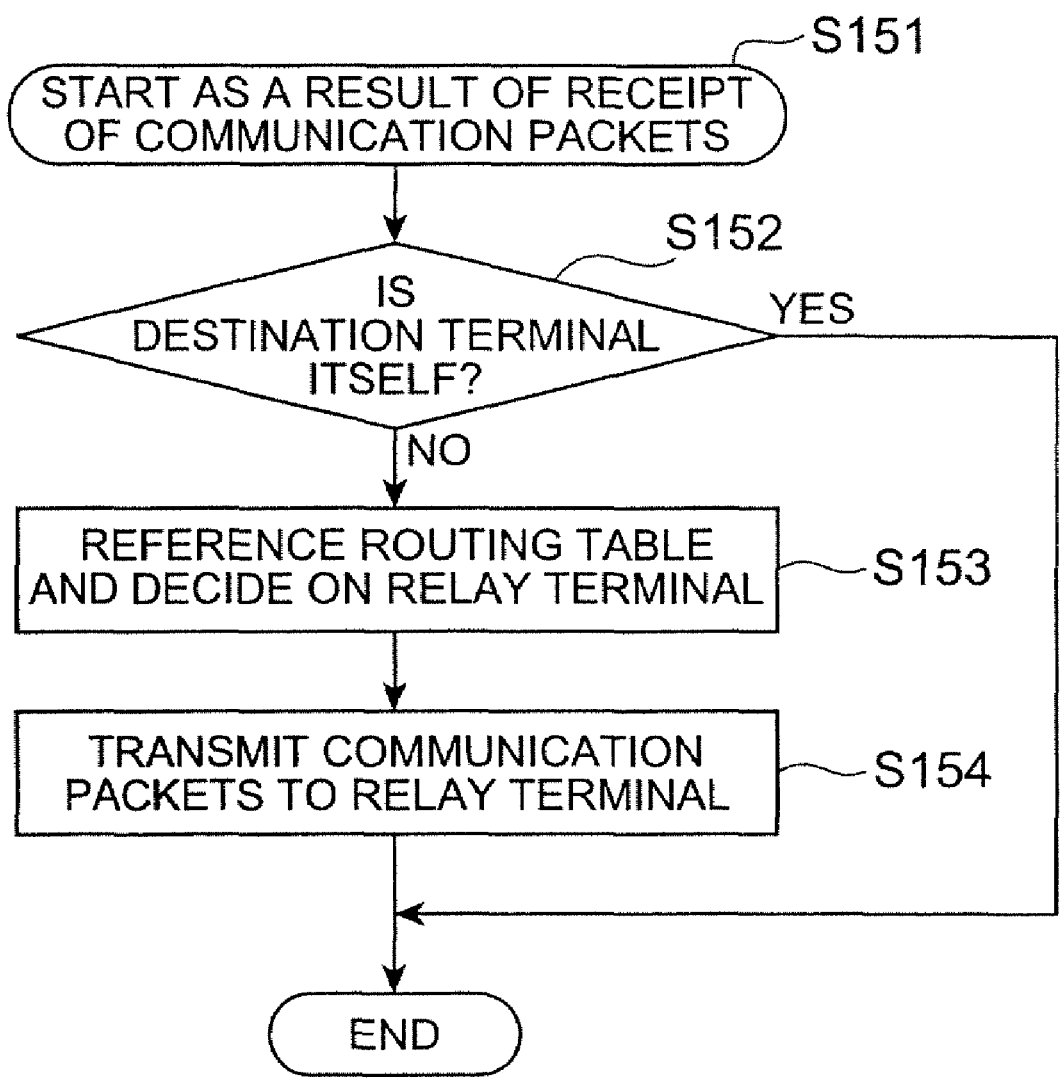
FIG. 15 shows the operation sequence of the mobile terminal device during the communication packet transfer of the first embodiment.

The operation of the mobile terminal device when communication packets are transferred will be described next using FIG. 15. Upon receipt of the communication packets, the mobile terminal device 20 starts the processing of FIG. 15 (S151) and confirms whether the received communication packets are its own (S152). Here, when the received communication packet is addressed to itself, the transfer of the communication packets is unnecessary and the processed is ended. However, when the received communication packet is not addressed to itself in S152, the mobile terminal device 20 references the routing table 210A and confirms the ID of the adjacent terminal which is to perform the relaying next (S153). Thereafter, the mobile terminal device 20 transfers the communication packets to the adjacent terminal obtained through confirmation (the adjacent terminal which is to perform the relaying next) (S154).

Figure 10:
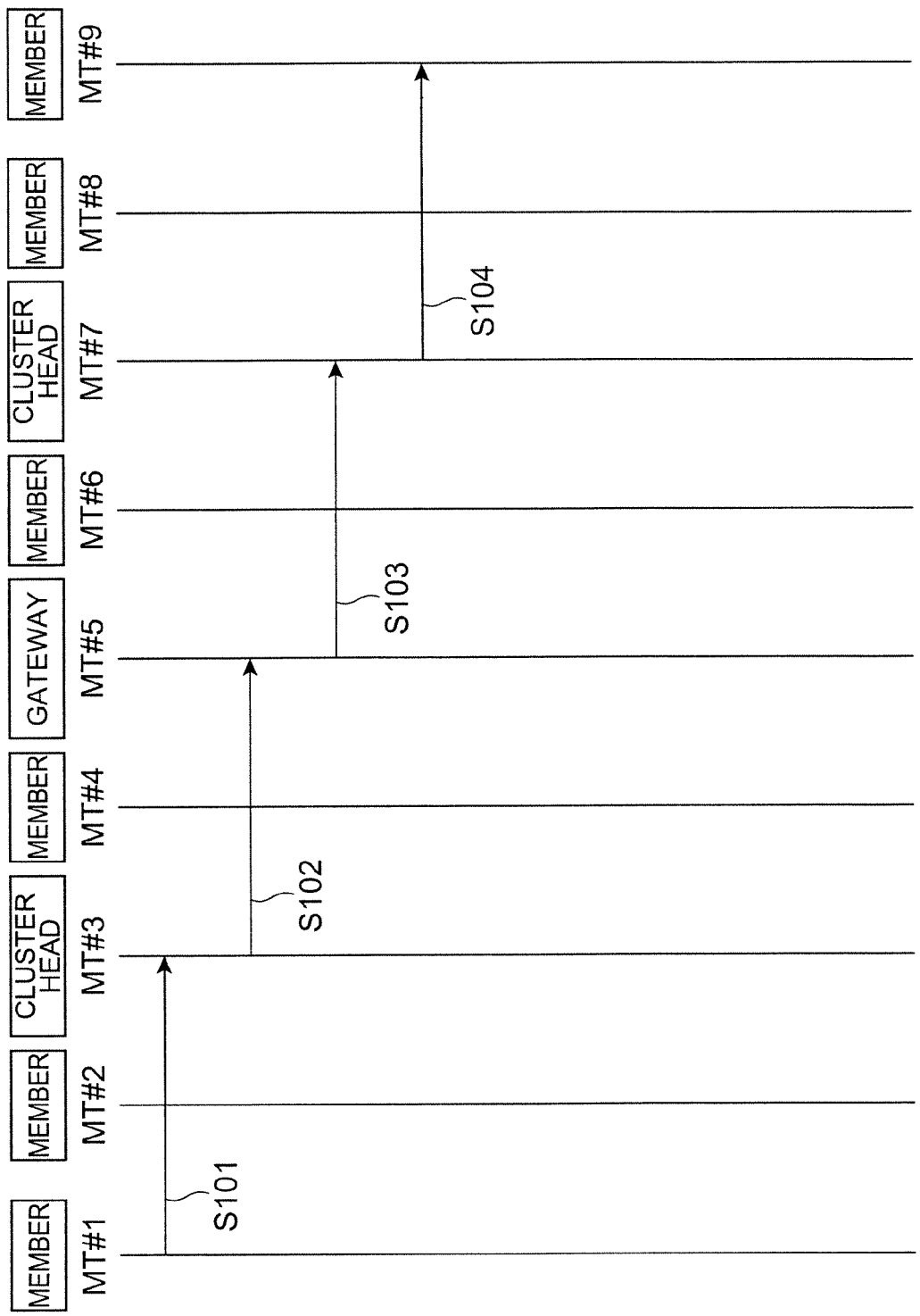
FIG. 10 shows the operation sequence of the whole mobile communication system during the communication packet transmission of the first embodiment.

The operation sequence of the whole mobile communication system during communication packet transmission will be described next using FIG. 10. FIG. 10 shows a sequence for transmitting communication packets from MT#1 to MT#9.

The data transceiver section 24 of MT#1 which transmits the communication packets issues an inquiry to the routing section 26 to inquire after the terminal which is to perform the relaying in order to transmit the communication packets to the destination terminal MT#9. The routing section 26 which receives the inquiry references the NextHop entry in the routing table 210A to obtain the terminal MT#3 which is to perform the relaying in order to transmit the communication packets to the destination terminal MT#9 and communicates the information on the terminal which is to perform the relaying (MT#3) to the data transceiver section 24. The data transceiver section 24 which has received the report transfers the communication packet to the MT#3 which is the terminal that is to perform the relaying (S101).

The data transceiver section 24 of the MT#3 which receives the communication packets then issues an inquiry to the routing section 26 to inquire after the terminal which is to perform the relaying in order to transmit the communication packets to the destination terminal MT#9. The routing section 26 which received the inquiry references the NextHop entry in the routing table 210A, obtains terminal MT#5 which is to perform relaying in order to transmit the communication packets to destination terminal MT#9, and reports the terminal information (MT#5) to be relayed to the data transceiver section 24. The data transceiver section 24, which receives the report, transfers the communication packets to MT#5 which is the terminal that is to perform the relaying (S102).

Thereafter, the data transceiver section 24 of MT#5 which receives the communication packet issues an inquiry to the routing section 26 to inquire after the terminal which is to perform relaying in order to transmit communication packets to the destination terminal MT#9. The routing section 26, which receives the inquiry, references the NextHop entry in the routing table 210A, obtains terminal MT#7 which is to perform relaying in order to transmit communication packets to the destination terminal MT#9, and reports the terminal information (MT#7) to be relayed to the data transceiver section 24. The data transceiver section 24, which receives the report, transfers the communication packets to MT#7 which is the terminal that is to perform the relaying (S103).

Thereafter, the data transceiver section 24 of MT#7 which receives the communication packet issues an inquiry to the routing section 26 to inquire after the terminal that is to perform the relaying in order to transmit the communication packets to the destination terminal MT#9. The routing section 26, which receives the report, references the NextHop entry in the routing table 210A and reports the fact that same can be transmitted directly to the destination terminal MT#9 to the data transceiver section 24. The data transceiver section 24 which receives the report directly transfers communication packets to the MT#9 (S104).

As a result of the above operation, communication packets are transmitted from MT#1 to MT#9.

The results of the first embodiment will be described next. According to the mobile terminal device of the first embodiment, as a result of only the cluster head transmitting link information between adjacent terminals to all the terminals on the network, the route between any terminals can be calculated for all the terminals. Furthermore, according to the mobile terminal device of this embodiment, link information can be transmitted to all the terminals on the network as a result of only the cluster head and gateway transferring link information. As a result of the two results above, routing without overhead can be implemented.

Second Embodiment

Figure 17:
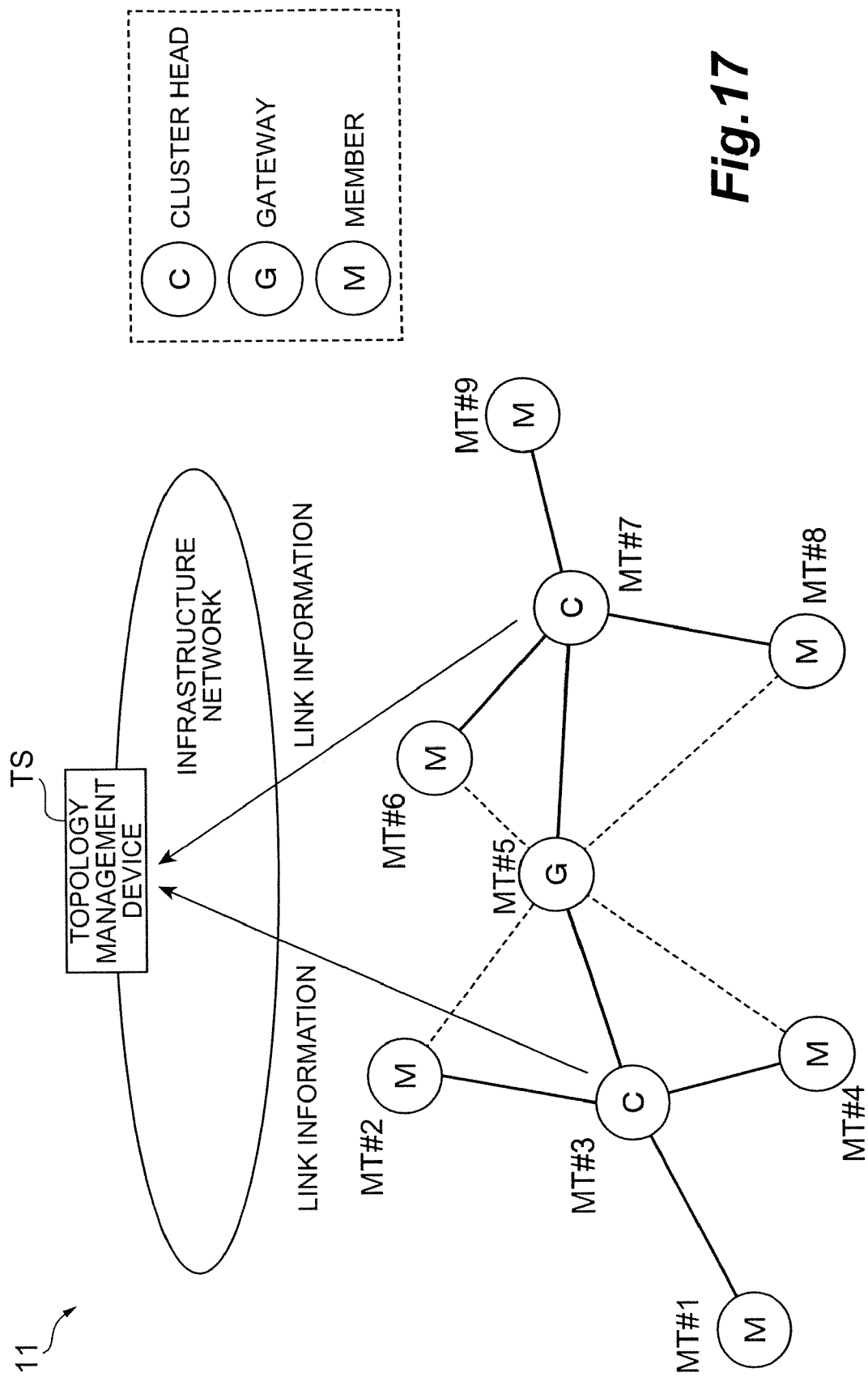
FIG. 17 is a network constitutional view of the mobile communication system of the second embodiment.

The constitution of the mobile communication system of the second embodiment of the present invention will be described next with reference to FIGS. 17 to 22. As shown in FIG. 17, the mobile communication system 11 of this embodiment is configured to include a plurality of mobile terminal devices MT#1 to MT#9 and a topology management device TS that is installed on an infrastructure network such as a cellular network. The mobile terminal devices MT#1 to MT#9 all have the same constitution and have the same functions. However, any one state of three states, namely, a cluster head, gateway, and member, is assumed. The state of each mobile terminal device is not fixed and changes dynamically depending on the relative positional relationship with other terminals. The states of the respective mobile terminal devices of the mobile communication system 10 are determined dynamically in order to satisfy the following conditions:

1. Cluster heads are not adjacent.

2. A member is adjacent to a cluster head and designates one of the adjacent cluster heads.

3. Cluster heads are connected by just one gateway.

In the example of FIG. 17, the MT#3 and MT#7 are configured as cluster heads, MT#5 is configured as a gateway, MT#1, MT#2, MT#4, MT#6, MT#8, and MT#9 are configured as members.

Further, the number of mobile terminal devices is nine in FIG. 17. However, as long as three conditions relating to the state of the mobile terminal device are satisfied, there are no restrictions on the number of mobile terminal devices.

In the case of this embodiment, the cluster head transmits link information on links between itself and terminals adjacent to itself to the topology management device TS. As a result, the topology management device TS can obtain the link information required for routing and is able to compute the route between any terminals. Here, the meaning of 'link information' is the same as that for the link information of the first embodiment.

Figure 18:
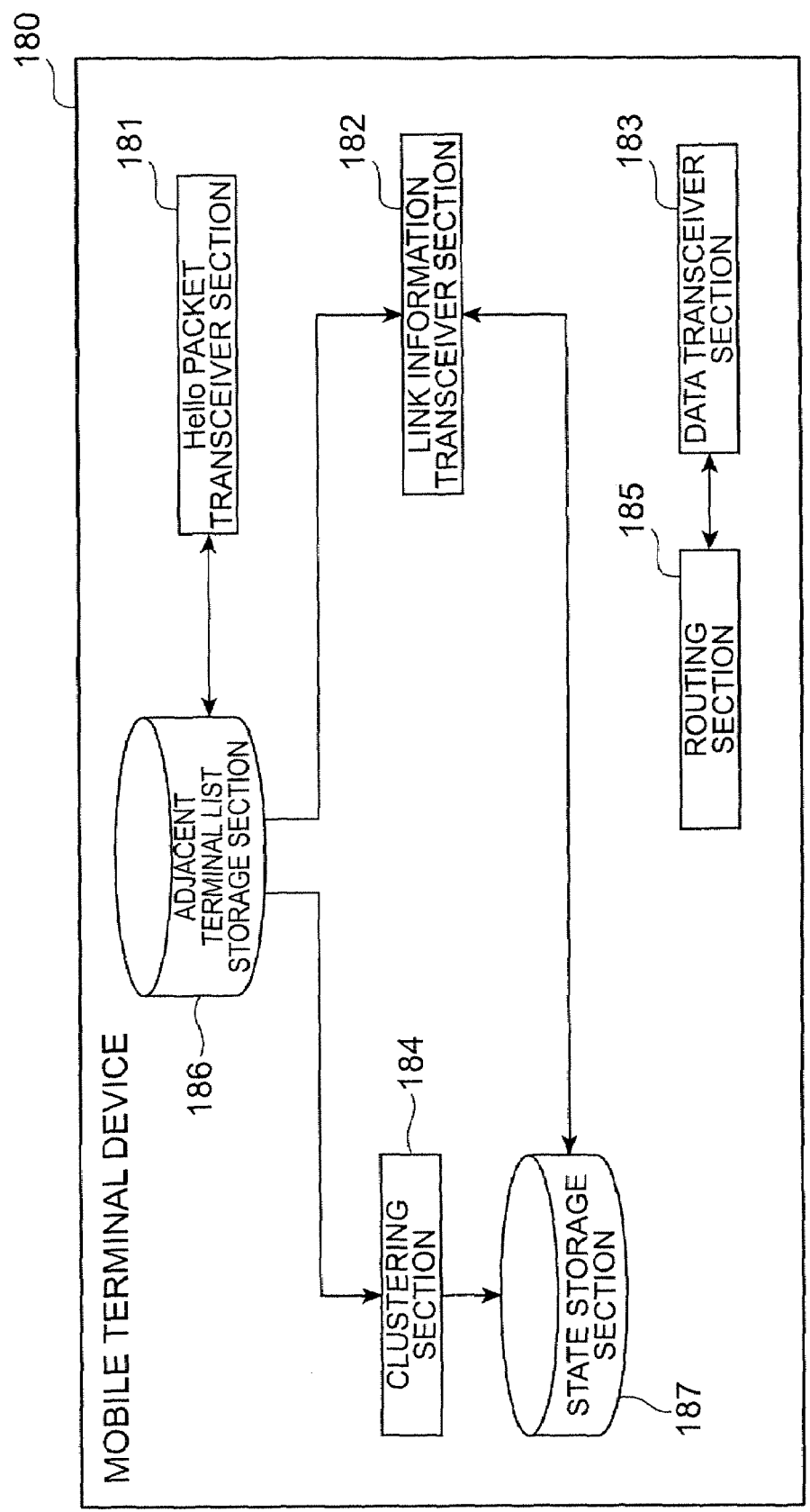
FIG. 18 is a functional block constitutional view of the mobile terminal device of the second embodiment.

The constitution of the mobile terminal devices MT#1 to MT#9 of this embodiment (generally referred to as the 'mobile terminal device 180' in the second embodiment) will be described next. FIG. 18 shows the functional block constitution of the mobile terminal device 180 of this embodiment. The mobile terminal device 180 comprises a Hello packet transceiver section 181, a link information transceiver section 182, a data transceiver section 183, a clustering section 184, a routing section 185, an adjacent terminal list storage section 186, and a state storage section 187. Each of these constituent parts will be described next in sequence.

The Hello packet transceiver section 181, clustering section 184, adjacent terminal list storage section 186, and state storage section 187 are the same as those in the first embodiment.

The link information transceiver section 182 is configured to transmit link information to the topology management device TS. The link information transceiver section 182 references the state storage section 187 and, when the state of the mobile terminal device itself is the cluster head, the link information transceiver section 182 references the adjacent terminal list storage section 186 and transmits link information constituting a tree to the topology management device TS. Here, the meaning of 'tree' is the same as that for the first embodiment.

Figure 22:
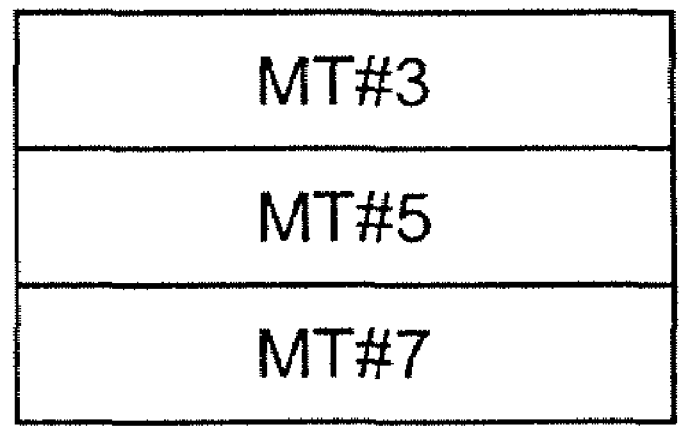
FIG. 22 shows a constitutional example of the relay terminal ID list.

The data transceiver section 183 is configured to transmit, receive, or transfer, via a unicast, packets (communication packets) that are transmitted in data communication or a speech calls or the like between terminals. When a communication packet is transmitted, the data transceiver section 183 asks the routing section 185 for a list of the IDs of the adjacent terminals which are relay terminals for delivering the communication packets to the destination terminal and transmits the communication packets and list of IDs to the terminal with the first ID in the list of IDs of adjacent terminals. Here, the list of IDs is configured as per FIG. 22, for example, and shows the terminals that relay communication packets from the transmission terminal to the destination terminal in relay order. Upon receiving communication packets from another terminal and if the destination is not itself, the data transceiver section 183 references the received list of IDs and transfers the communication packets and the list of IDs to the terminal which has the ID that appears after the ID of the mobile terminal device itself. Thereupon, when the ID of the mobile terminal device itself appears last in the list, the data transceiver section 183 transmits the communication packets to the destination terminal. For example, if the list of IDs in FIG. 22 is received and the ID of the mobile terminal device itself is MT#5, the data transceiver section 183 transfers the communication packets to the terminal with the ID that appears after MT#5(MT#7).

The routing section 185 is configured to receive a request from the data transceiver section 183 and, by issuing an inquiry to the topology management device TS, report the list of IDs of the relay terminals for relaying the communication packets to the data transceiver section 183.

Figure 20:
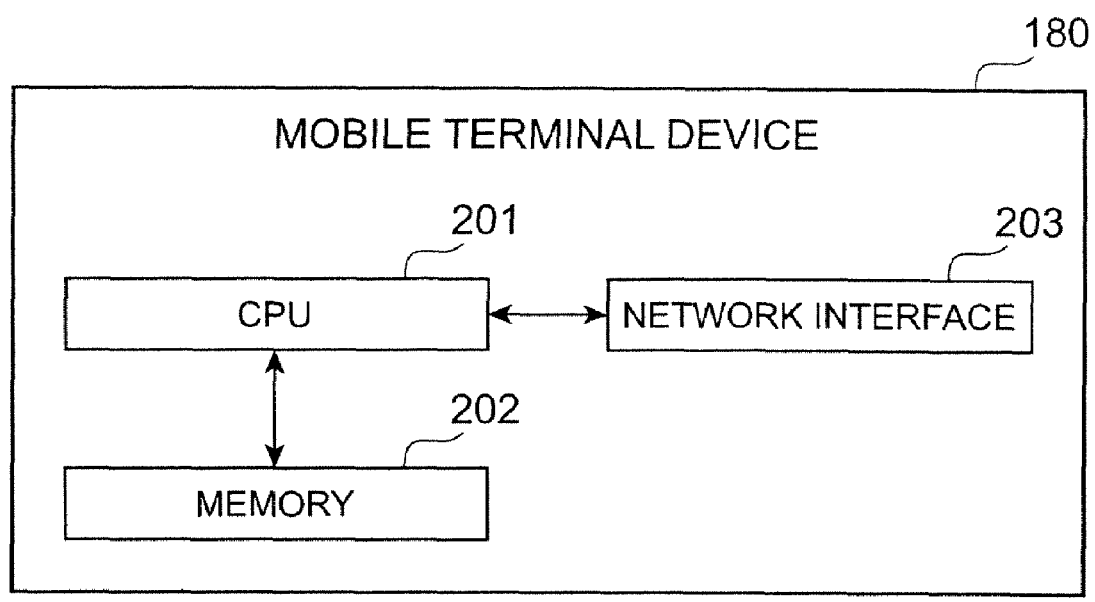
FIG. 20 is a hardware constitutional view of the mobile terminal device of the second embodiment.

The hardware constitution of the mobile terminal device 180 of the second embodiment will be described next by using FIG. 20. The mobile terminal device 180 is configured to include a CPU 201, a memory 202, and a network interface 203. The Hello packet transceiver section 181 shown in FIG. 18 is implemented by the CPU 201 and network interface 203. The link information transceiver section 182 is implemented by the CPU 201 and the network interface 203. The data transceiver section 183 is implemented by the CPU 201 and the network interface 203. The clustering section 184 is implemented by the CPU 201. The routing section 185 is implemented by the CPU 201 and the network interface 203. The adjacent terminal list storage section 186 is implemented by the memory 202. The state storage section 187 is implemented by the memory 202.

Figure 19:
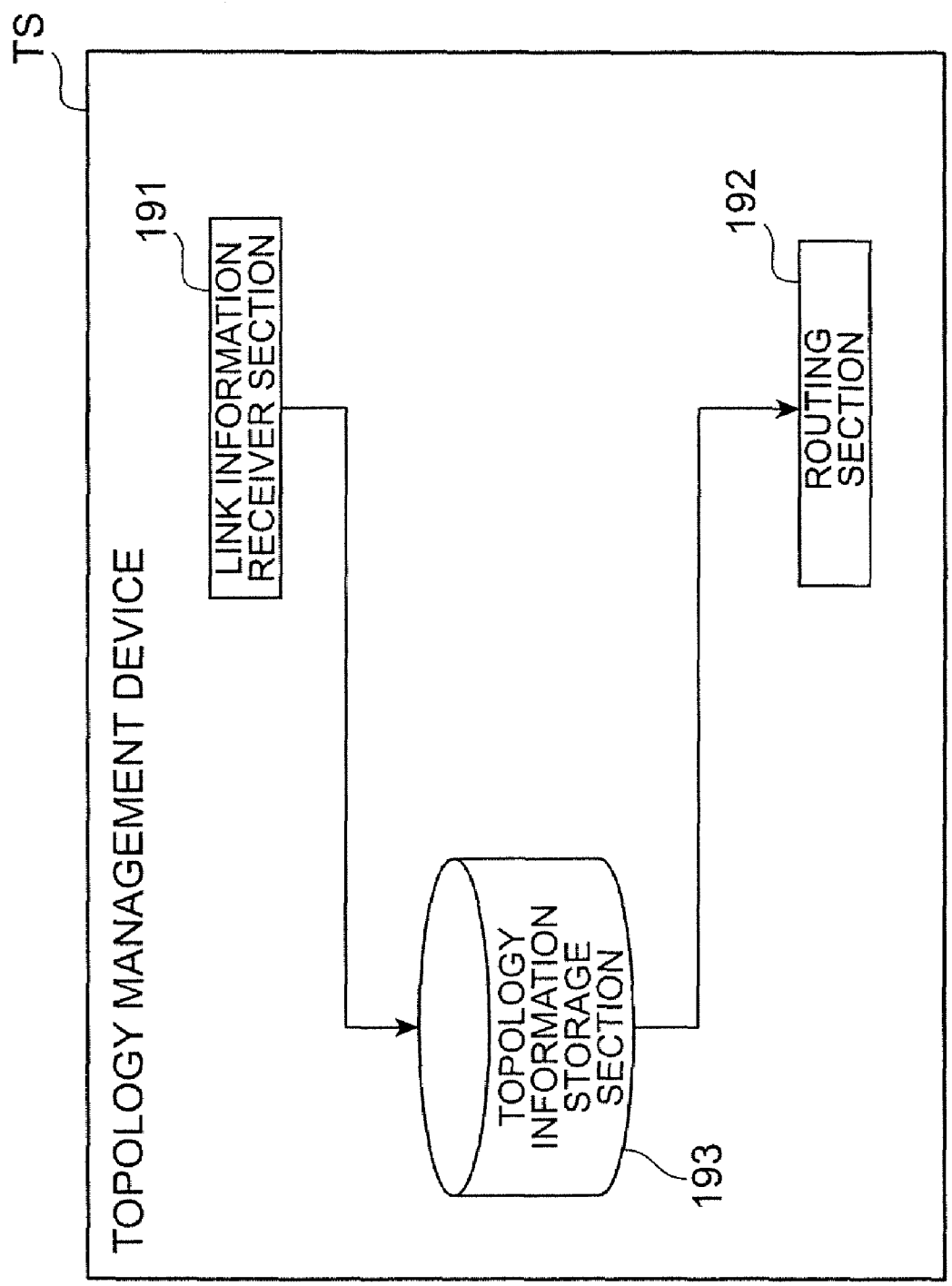
FIG. 19 is a functional block constitutional view of a topology management device of the second embodiment.

The constitution of the topology management device TS of this embodiment will be described next using FIG. 19. The topology management device TS is configured to include a link information receiver section 191, a routing section 192, and a topology information storage section 193. Further, the link information receiver section 191 corresponds to the link information receiving module of the present invention and the routing section 192 and topology information storage section 193 correspond to the list providing module of the present invention.

The link information receiver section 191 is configured to receive link information from the mobile terminal device 180 and store the link information in the topology information storage section 193. The topology information storage section 193 holds a topology table 29A such as the one in FIG. 5. The topology table 29A contains the ID of the cluster head that transmitted the link information and the IDs of terminals which are adjacent to the cluster head.

The routing section 192 is configured to receive a request from the mobile terminal device 180, reference the topology information storage section 193, calculate a list of IDs of the relay terminals, and transmit same to the mobile terminal device 180. The calculation of the list of IDs is performed by means of the Dijkstra method, for example.

Figure 21:
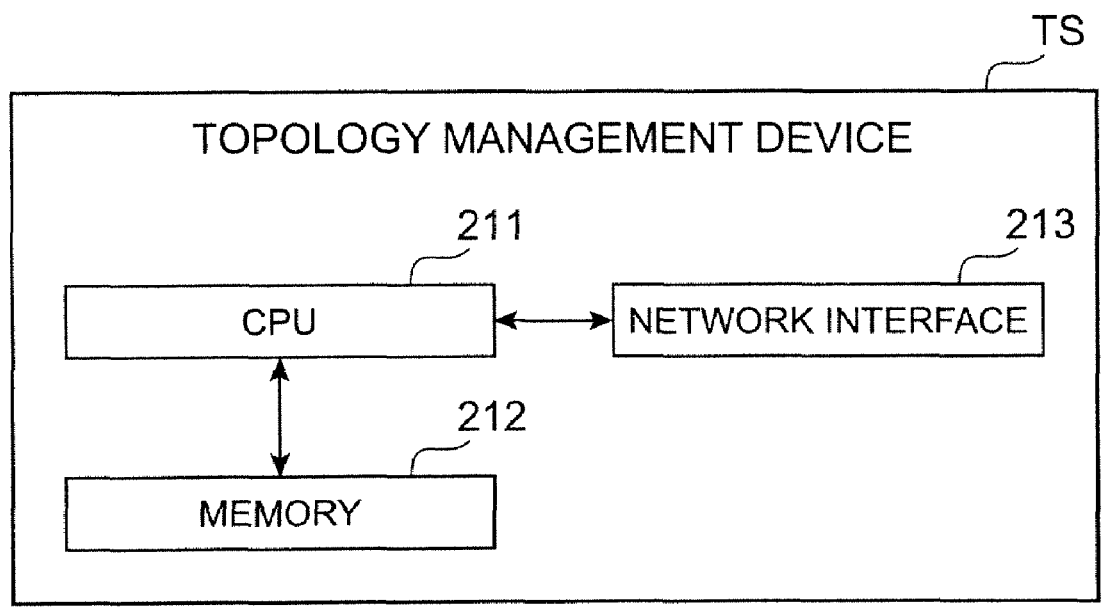
FIG. 21 is a hardware constitutional view of the topology management device of the second embodiment.

The hardware constitution of the topology management device TS will be described next using FIG. 21. The topology management device TS is configured to include a CPU 211, a memory 212, and a network interface 213. The link information receiver section 191 in FIG. 19 is implemented by the CPU 211 and the network interface 213. The routing section 192 is implemented by the CPU 211 and the network interface 213 and the topology information storage section 193 is implemented by the memory 212.

The operation of the mobile terminal device 180 and topology management device TS of this embodiment will be described next using FIGS. 23 to 26. Further, among (1) the operation during cluster constitution, (2) the operation during link information transmission, and (3) the operation during communication packet transmission, (1) the operation of the mobile terminal device during cluster constitution is the same as that of the first embodiment, a description of the latter is omitted here. Further, (2) the operation of the mobile terminal device 180 during link information transmission differs from that of the first embodiment in that, instead of the link information being broadcast, the link information is transmitted to the topology management device TS and a transfer of link information is not performed.

Figure 23:
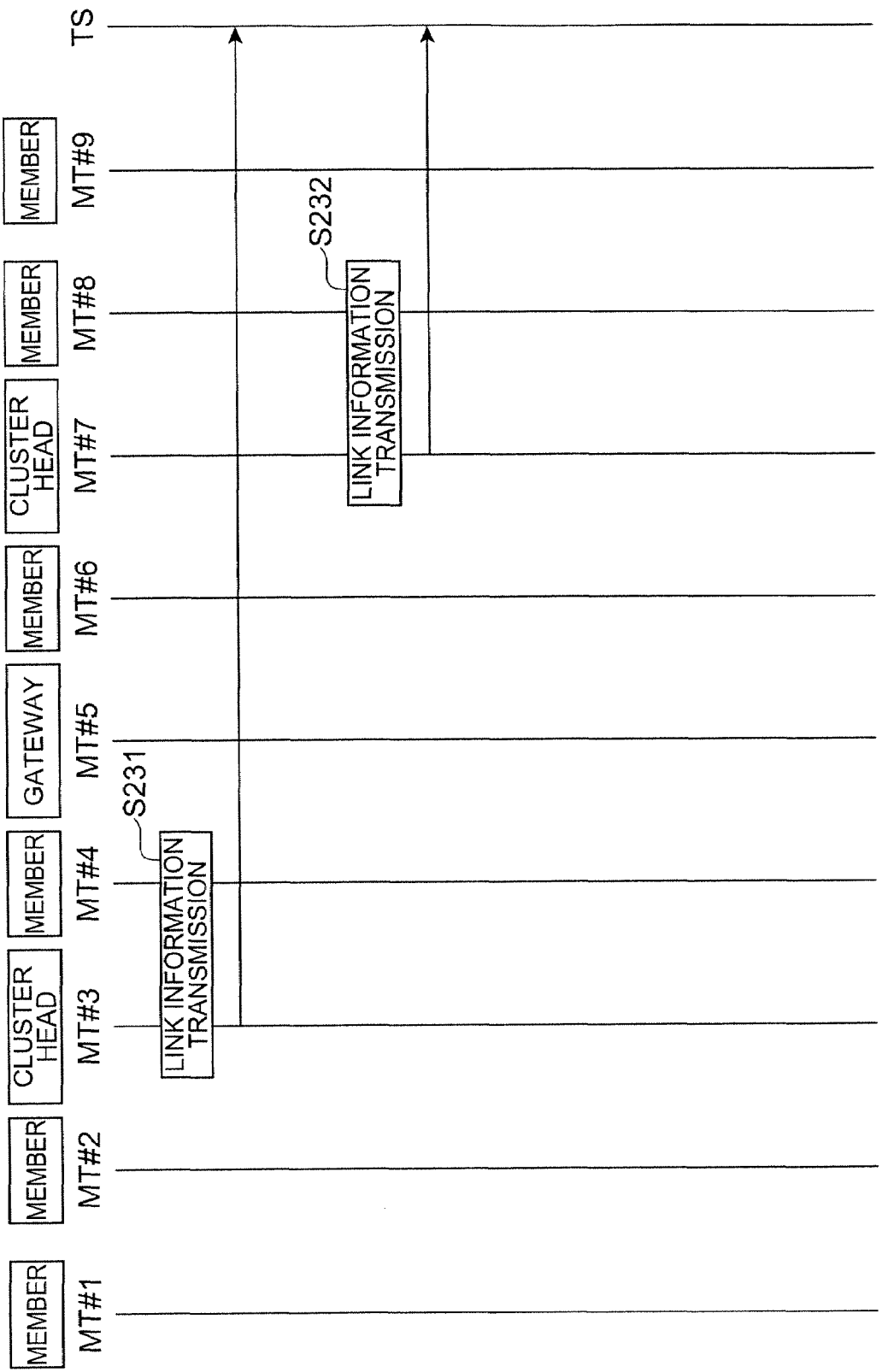
FIG. 23 shows the operation sequence of the whole mobile communication system during the link information transmission of the second embodiment.

First, (2) the overall operation of the mobile communication system 11 during link information transmission will be described using FIG. 23. The link information transceiver section 182 of MT#3 which is the cluster head transmits link information at fixed intervals to the topology management device TS. The link information transceiver section 22 of MT#3 first references the adjacent terminal table 27A and lists the adjacent terminal IDs for which the tree constitution entry is 'Y'. In this case, MT#1, MT#2, MT#4, and MT#5 are given in the list. Thereafter, a list obtained by adding the ID of the mobile terminal device itself (MT#3) to the list is transmitted to the topology management device TS as link information (S231 in FIG. 23). The link information receiver section 191 of the topology management device TS, which receives the link information, stores the link information thus received in the topology information storage section 193. In this case, the ID of the cluster head (MT#3) and the IDs of the terminals adjacent to the cluster head (MT#1, MT#2, MT#4, and MT#5) are stored in the topology information storage section 193. Likewise, the MT#7 which is the cluster head also transmits link information to the topology management device TS (S232) and the link information receiver section 191 of the topology management device TS stores the link information thus received in the topology information storage section 193.

Figure 25:
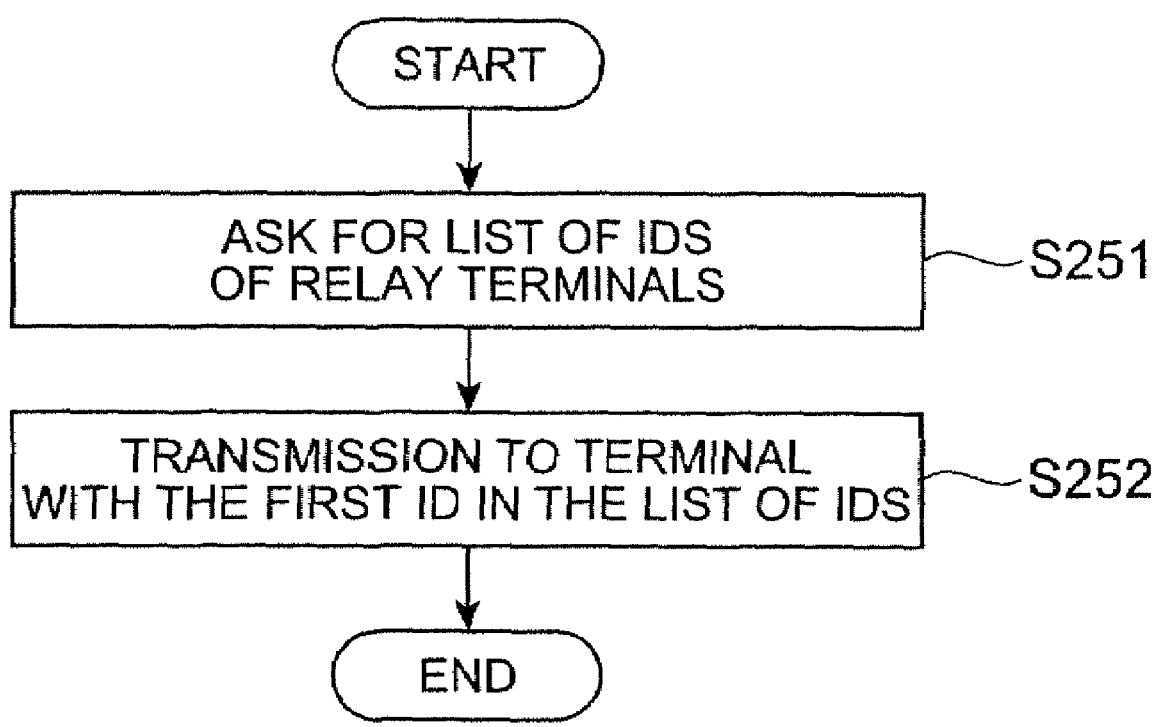
FIG. 25 shows the operation sequence of the mobile terminal device during the communication packet transmission of the second embodiment.

(3) The operation of the mobile terminal device 180 during transmission of the communication packets (packets of data communication or of a speech call or the like) will be described using FIG. 25. The mobile terminal device 180 first issues an inquiry to the topology management device TS for a list of IDs of relay terminals (S251). The communication packets and list of IDs are then transmitted in response to the inquiry to the terminals of the IDs that first appear in the list of IDs obtained from the topology management device TS (S252).

Figure 26:
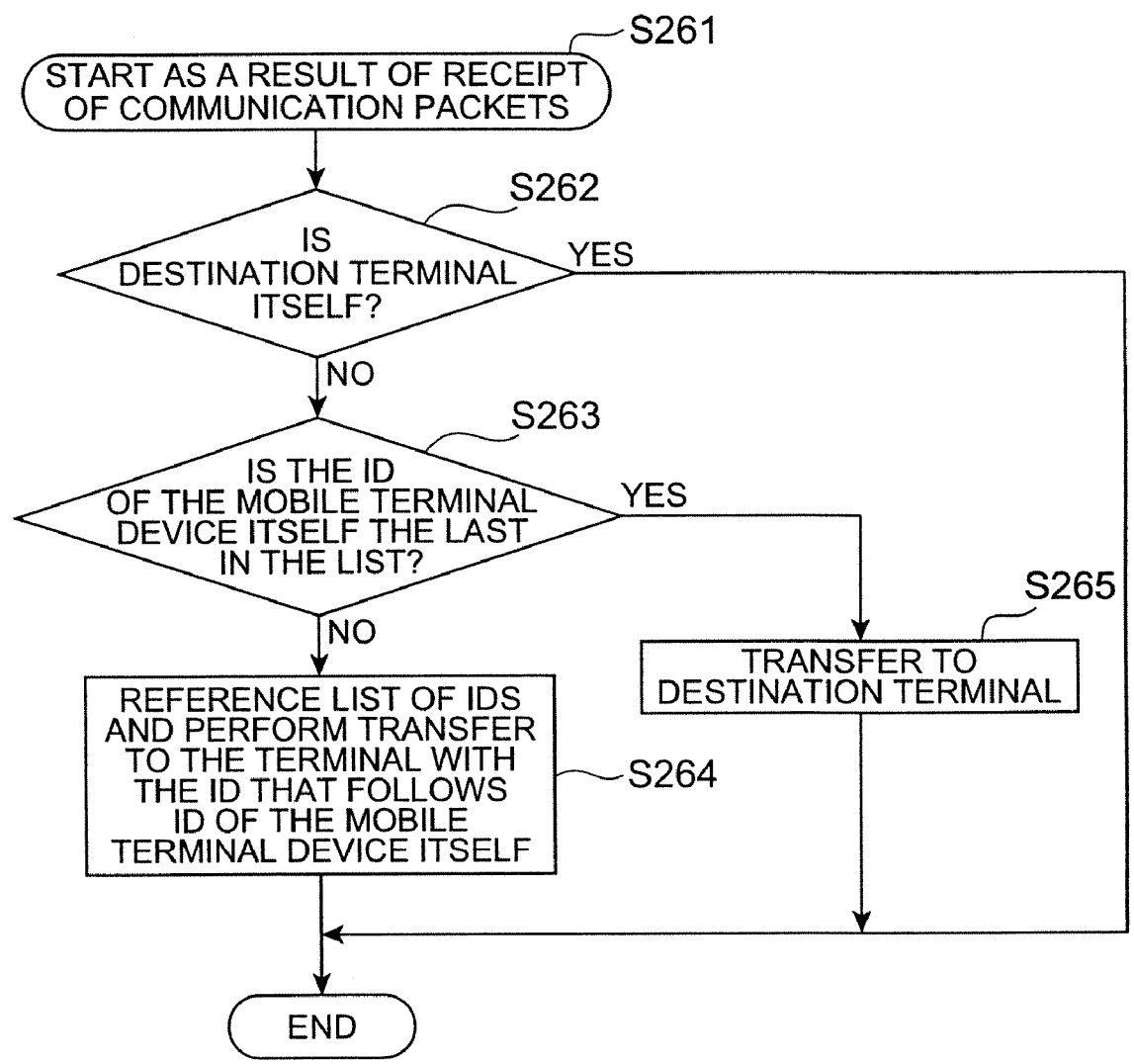
FIG. 26 shows the operation sequence of the mobile terminal device during the communication packet transfer of the second embodiment.

(3) The operation of the mobile terminal device 180 during the transfer of communication packets will be described next using FIG. 26. Upon receipt of the communication packets from another terminal (S261), the mobile terminal device 180 starts the processing of FIG. 26 and checks whether it is itself the destination terminal for the received communication packets (S262). Here, when the mobile terminal device 180 is itself the destination terminal, because the transfer of the received communication packets is unnecessary, the processing is ended without transferring the communication packets. On the other hand, when the destination terminal is not itself in S262, the mobile terminal device 180 checks whether the ID of the mobile terminal device itself appears last in the list (S263). Here, when the ID of the mobile terminal device itself appears last in the list, the destination terminal of the mobile terminal device 180 is then adjacent thereto. Hence, the mobile terminal device 180 transfers the communication packets and list of IDs to the destination terminal (S265). When, on the other hand, the ID of the mobile terminal device itself is not last in the list in S263, the mobile terminal device 180 references the list of IDs and transfers communication packets and the ID of the mobile terminal device itself to the terminal which has the ID that follows the ID of the mobile terminal device itself (S264).

Figure 24:
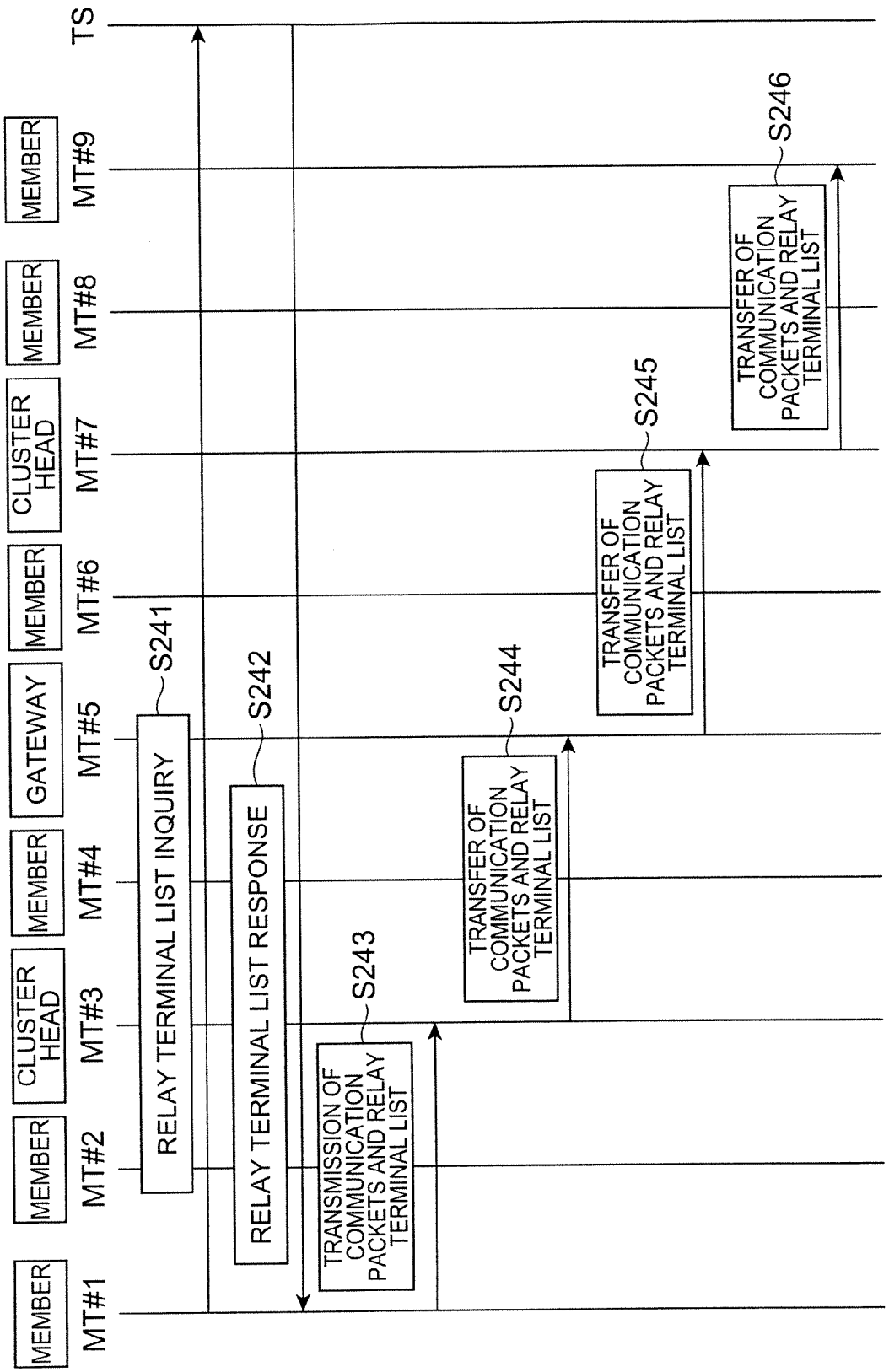
FIG. 24 shows the operation sequence of the whole mobile communication system during the communication packet transmission of the second embodiment.

(3) The operation of the whole of the mobile communication system 11 during the transfer of communication packets will be described next using FIG. 24. FIG. 24 shows the sequence according to which communication packets are transmitted from MT#1 to MT#9. The data transceiver section 183 of MT#1 which transmits communication packets issues an inquiry to the routing section 185 for a list of the IDs of relay terminals for delivering the communication packets to the destination terminal and the routing section 185 issues an inquiry to the topology management device TS for a list of the IDs of the relay terminals (S241). The routing section 192 of the topology management device TS which receives the inquiry creates a list of the IDs of the relay terminals by referencing the topology information storage section 193 and returns the list of the IDs of the relay terminals to the routing section 185 of MT#1 (S242). As a result, the routing section 185 of MT#1 obtains the list of the IDs of the relay terminals.

Thereafter, the routing section 185 of MT#1 reports the list of the IDs of the relay terminals to the data transceiver section 183. The data transceiver section 183, which receives the report, transmits the communication packets and list of IDs to MT#3 which appears first in the list of the IDs of the relay terminals (S243). Further, the data transceiver section 183 of MT#3, which receives the communication packets and list of IDs, references the list of IDs and transfers the communication packets and list of IDs to MT#5 which follows the data transceiver section 183 in the list of IDs (S244).

The data transceiver section 183 of MT#5, which receives the communication packets and list of IDs, references the list of IDs and transfers the communication packets and list of IDs to MT#7 which follows the data transceiver section 183 in the list of IDs (S245). In addition, the data transceiver section 183 of MT#7, which receives the communication packets and list of IDs, references the list of IDs and judges that the ID of the mobile terminal device itself (MT#7) appears last in the list. In other words, the destination terminal (MT#9) is adjacent to the data transceiver section 183 and, therefore, the data transceiver section 183 of MT#7 transfers the communication packets and list of IDs to the destination terminal (MT#9) (S246). Thus, the communication packets and list of IDs are delivered to the destination terminal MT#9.

Finally, the results of the second embodiment will be described. With the mobile terminal device 180 and topology management device TS of this embodiment, the topology management device TS is able to calculate routes between any terminals simply as a result of the cluster head alone transmitting link information on links between adjacent terminals to the topology management device TS. Routing with minimal overhead can be implemented as a result of this effect.

The disclosure of Japanese Patent Application No. 2006-053620 filed Feb. 28, 2006 including specification, drawings and claims is incorporated herein by reference in its entirety.

What is claimed is:

1. A mobile terminal device in an environment where an adhoc network is formed by a plurality of mobile terminal devices, comprising:

a clustering module configured to identify an ID and state of a mobile terminal device that is adjacent to the mobile terminal device itself by sending and receiving a packet containing the ID and state of the mobile terminal device itself to and from another mobile terminal device, and to set the state of the mobile terminal device itself as a cluster head, gateway or member on the basis of the state of the adjacent mobile terminal device and the state of the mobile terminal device itself, wherein the clustering module is configured to set the state of the mobile terminal device itself as the cluster head, gateway, or member, so as to constitute a cluster such that cluster heads are not adjacent with each other, and a designation is made that a member is adjacent to a cluster head and belongs to only one cluster head, and the cluster heads are connected by only one gateway;

a storage module configured to store the ID and state of the adjacent mobile terminal device that is identified by the clustering module as well as the state of the mobile terminal device itself;

a link information transmit/receive module configured to transmit link information comprising the stored IDs of one or more of the adjacent mobile terminal devices and the ID of the mobile terminal device itself when the state of the mobile terminal device itself which is stored by the storage module is the cluster head, and receive the link information transmitted from the other mobile terminal device irrespective of the stored state of the mobile terminal device itself; and a routing module configured to find the route to any mobile terminal device on the basis of the link information transmitted and received by the link information transmit/receive module.

2. The mobile terminal device according to claim 1, wherein the clustering module is configured to:

transmit and receive control information containing the ID of the mobile terminal device itself, the state of the mobile terminal device itself, and ID information of a mobile terminal device designated as a parent by the mobile terminal device itself;

store the received control information in the storage module;

determine the state of the mobile terminal device itself as the member, when the ID of a mobile terminal device the state of which is the cluster head exists in the stored control information;

determine the state of the mobile terminal device itself as the cluster head, when the ID of a mobile terminal device the state of which is the cluster head does not exist in the stored control information and the ID of a mobile terminal device which is the gateway exists in the stored control information;

determine the state of the mobile terminal device itself as the cluster head, when neither the ID of a mobile terminal device the state of which is the cluster head nor the ID of a mobile terminal device the state of which is the gateway exists in the stored control information; and change the state of the mobile terminal device itself to the gateway when the state of the mobile terminal device itself is the member and the ID of the mobile terminal device which designates the mobile terminal device itself as the parent and the state of which is the cluster head exists in the stored control information.

3. The mobile terminal device according to claim 1, wherein the clustering module is configured to:

initialize the state of the mobile terminal device itself upon deletion of the ID of the mobile terminal device designated as a parent by the mobile terminal device itself from the stored control information; and reference the stored control information and initialize the state of the mobile terminal device itself upon initialization of the state of the mobile terminal device designated as the parent by the mobile terminal device itself.

4. The mobile terminal device according to claim 1, wherein the link information transmit/receive module is configured to transmit link information comprising the ID of a gateway that is adjacent to the mobile terminal device itself, the ID of a member designating the mobile terminal device itself as a parent, and the ID of the mobile terminal device itself, as the transmitted link information.

5. The mobile terminal device according to claim 1, wherein the link information transmit/receive module is configured to transfer the link information received from another mobile terminal device when the state of the mobile terminal device itself stored by the storage module is the cluster head or gateway.

6. A mobile communication system, comprising:

a plurality of the mobile terminal devices according to claim 1, and a topology management device that includes an information receiving module configured to receive link information that comprises the ID of the mobile terminal device and the IDs of one or more mobile terminal devices that are adjacent to the mobile terminal device, and a list supplying module configured to determine a list of the IDs of mobile terminal devices that are to serve as relays for performing communication between a plurality of mobile terminal devices on the basis of the link information and supply the list to the mobile terminal device which constitutes the origin of the communication.

7. A control method that is executed by a mobile terminal device in an environment where an adhoc network is formed by a plurality of the mobile terminal devices, comprising:

identifying the ID and state of a mobile terminal device that is adjacent to the mobile terminal device itself by sending and receiving a packet containing the ID and state of the mobile terminal device itself to and from another mobile terminal device, and setting the state of the mobile terminal device itself as a cluster head, gateway or member on the basis of the state of the adjacent mobile terminal device and the state of the mobile terminal device itself, wherein the setting includes setting the state of the mobile terminal device itself as the cluster head, gateway, or member, so as to constitute a cluster such that cluster heads are not adjacent with each other, and a designation is made that a member is adjacent to a cluster head and belongs to only one cluster head, and the cluster heads are connected by only one gateway;

storing the ID and state of the adjacent mobile terminal device that is identified in the clustering as well as the state of the mobile terminal device itself;

transmitting link information comprising the stored IDs of one or more of the adjacent mobile terminal devices and the ID of the mobile terminal device itself when the state of the mobile terminal device itself which is stored in the storing is the cluster head and receiving the link information transmitted from the other mobile terminal device irrespective of the stored state of the mobile terminal device itself; and finding the route to any mobile terminal device on the basis of the link information transmitted and received.

8. A control method for a mobile communication system comprising a topology management device and a plurality of mobile terminal devices, comprising:

identifying an ID and state of a first mobile terminal device that is adjacent to a second mobile terminal device by sending and receiving a packet containing the ID and state of the second mobile terminal device to and from another mobile terminal device, and setting the state of the second mobile terminal device as a cluster head, gateway or member on the basis of the state of the adjacent first mobile terminal device and the state of the second mobile terminal device, wherein the setting includes setting the state of the second mobile terminal device as the cluster head, gateway, or member, so as to constitute a cluster such that cluster heads are not adjacent with each other, and a designation is made that a member is adjacent to a cluster head and belongs to only one cluster head, and the cluster heads are connected by only one gateway;

storing, at the second mobile station, the ID and state of the adjacent first mobile terminal device as well as the state of the second mobile terminal device;

transmitting, from the second mobile terminal device, to the topology management device, link information comprising the stored IDs of one or more adjacent mobile terminal devices and the ID of the second mobile terminal device itself when the state of the second mobile terminal device is cluster head;

receiving the link information at the topology management device; and determining, at the topology management device, a list of the IDs of mobile terminal devices which are to serve as relays for performing communication between a plurality of mobile terminal devices on the basis of the received link information and supplying the list to a mobile terminal device which constitutes an origin of communication.

* * * * *